United States Patent
Johnson et al.

(10) Patent No.: US 11,560,821 B2
(45) Date of Patent: *Jan. 24, 2023

(54) DECOMPOSITION CHAMBER FOR AFTERTREATMENT SYSTEMS

(71) Applicant: Cummins Emission Solutions Inc., Columbus, IN (US)

(72) Inventors: Samuel Johnson, Columbus, IN (US); Ryan M. Johnson, Cottage Grove, WI (US); Kartiki Jagtap, Phaltan (IN); Enoch Nanduru, Pune (IN); Mahendra Mittapalli, Mancherial (IN); Udit Bhaveshkumar Shah, Gandhinagar (IN); Suraj D. Khalate, Pune (IN); Pradnya Chandrakant Joshi, Ahmednagar (IN); Vinay Kumar Joshi, Pune (IN); Vaidyanadan Sundaram, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,281

(22) Filed: Mar. 7, 2022

(65) Prior Publication Data

US 2022/0186651 A1 Jun. 16, 2022

Related U.S. Application Data

(63) Continuation of application No. 16/324,485, filed as application No. PCT/US2018/046680 on Aug. 14, 2018, now Pat. No. 11,300,030.

(30) Foreign Application Priority Data

Jul. 6, 2018 (IN) .............................. 201841025311

(51) Int. Cl.
| | | |
|---|---|---|
| *F01N 3/28* | (2006.01) |
| *F01N 3/20* | (2006.01) |
| *F01N 13/14* | (2010.01) |

(52) U.S. Cl.
CPC ......... *F01N 3/2892* (2013.01); *F01N 3/2066* (2013.01); *F01N 13/141* (2013.01);
(Continued)

(58) Field of Classification Search
CPC .. F01N 3/2892; F01N 13/141; F01N 2240/20; F01N 2260/06; F01N 2470/02;
(Continued)

(56) References Cited

U.S. PATENT DOCUMENTS

| | | |
|---|---|---|
| 2,972,764 A | 2/1961 | Linenfelser |
| 2,974,595 A | 3/1961 | Mohaupt |

(Continued)

FOREIGN PATENT DOCUMENTS

| | | |
|---|---|---|
| CN | 108194176 A | 6/2018 |
| EP | 3 085 913 A1 | 10/2016 |

(Continued)

OTHER PUBLICATIONS

First Examination Report for Indian Patent App. No. 201847039961 dated Feb. 14, 2021, 6 pages.
(Continued)

*Primary Examiner* — Jorge L Leon, Jr.
(74) *Attorney, Agent, or Firm* — Foley & Lardner LLP

(57) ABSTRACT

A decomposition chamber for an aftertreatment system includes: a body comprising: an inlet configured to receive exhaust gas, an outlet configured to expel the exhaust gas, a thermal management chamber in fluid communication with the inlet, the thermal management chamber configured to receive an exhaust gas first portion from the inlet, an exhaust assist chamber in fluid communication with the inlet, the
(Continued)

exhaust assist chamber configured to receive an exhaust gas second portion from the inlet, and a main flow chamber in fluid communication with the inlet, the main flow chamber configured to receive an exhaust gas third portion from the inlet, receive the exhaust gas first portion from the thermal management chamber, and receive the exhaust gas second portion from the exhaust assist chamber.

20 Claims, 23 Drawing Sheets

(52) U.S. Cl.
CPC ...... *F01N 2240/20* (2013.01); *F01N 2260/06* (2013.01); *F01N 2470/02* (2013.01); *F01N 2470/08* (2013.01); *F01N 2470/16* (2013.01); *F01N 2470/22* (2013.01); *F01N 2490/10* (2013.01); *F01N 2490/18* (2013.01); *F01N 2610/1453* (2013.01)

(58) Field of Classification Search
CPC .............. F01N 2470/08; F01N 2470/16; F01N 2470/22; F01N 2490/10; F01N 2610/1453
USPC ......................................... 60/295, 320, 324
See application file for complete search history.

(56) References Cited

U.S. PATENT DOCUMENTS

| | | | |
|---|---|---|---|
| 2,977,912 A | | 4/1961 | Max |
| D251,605 S | | 4/1979 | Anderson |
| D284,577 S | | 7/1986 | Dubose |
| D318,328 S | | 7/1991 | Brennan et al. |
| 5,227,593 A | * | 7/1993 | Takahashi ............... F01N 1/083 181/269 |
| 6,722,124 B2 | | 4/2004 | Pawson et al. |
| D559,869 S | | 1/2008 | Kelley et al. |
| D579,842 S | | 11/2008 | Ren |
| D596,649 S | | 7/2009 | Yan et al. |
| D597,106 S | | 7/2009 | Kelley et al. |
| D668,691 S | | 10/2012 | Ewringmann |
| D685,308 S | | 7/2013 | Verlengiere |
| 8,893,481 B2 | | 11/2014 | Katou et al. |
| 9,021,794 B2 | | 5/2015 | Goss et al. |
| D769,329 S | | 10/2016 | Ide et al. |
| 9,464,546 B2 | | 10/2016 | Perrot et al. |
| 9,707,525 B2 | | 7/2017 | De Rudder et al. |
| 9,816,421 B2 | | 11/2017 | Lorenz et al. |
| D823,205 S | | 7/2018 | Ihns et al. |
| 10,024,217 B1 | | 7/2018 | Johnson et al. |
| 10,190,465 B2 | | 1/2019 | Alano et al. |
| 10,245,564 B2 | | 4/2019 | De Rudder et al. |
| 10,337,379 B2 | | 7/2019 | Dimpelfeld et al. |
| 2007/0144126 A1 | | 6/2007 | Ohya et al. |
| 2009/0229254 A1 | | 9/2009 | Gibson |
| 2009/0313979 A1 | * | 12/2009 | Kowada ................. F01N 13/08 60/297 |
| 2010/0146950 A1 | * | 6/2010 | Hayashi ................ F01N 3/2066 60/303 |
| 2010/0186382 A1 | | 7/2010 | Schroeder et al. |
| 2010/0223916 A1 | | 9/2010 | Hayashi et al. |
| 2011/0099978 A1 | | 5/2011 | Davidson et al. |
| 2011/0146237 A1 | | 6/2011 | Adelmann et al. |
| 2011/0308234 A1 | | 12/2011 | De Rudder et al. |
| 2012/0151902 A1 | | 6/2012 | Yi et al. |
| 2012/0173062 A1 | | 7/2012 | Madurai Kumar et al. |
| 2012/0216513 A1 | | 8/2012 | Greber et al. |
| 2012/0227390 A1 | | 9/2012 | Wikaryasz et al. |
| 2014/0230411 A1 | | 8/2014 | De Rudder et al. |
| 2014/0230418 A1 | | 8/2014 | Perrot et al. |
| 2014/0260209 A1 | | 9/2014 | Goss et al. |
| 2014/0260220 A1 | | 9/2014 | Toelle |
| 2014/0261073 A1 | | 9/2014 | Cook |
| 2014/0286832 A1 | | 9/2014 | Yi et al. |
| 2014/0311137 A1 | | 10/2014 | Wikaryasz et al. |
| 2015/0059319 A1 | | 3/2015 | Shiva et al. |
| 2015/0071822 A1 | | 3/2015 | Stanavich et al. |
| 2015/0071827 A1 | | 3/2015 | Niaz |
| 2015/0233276 A1 | | 8/2015 | Cassity et al. |
| 2015/0273411 A1 | | 10/2015 | Chapman et al. |
| 2015/0308316 A1 | * | 10/2015 | Li ........................ F01N 3/208 60/295 |
| 2015/0361849 A1 | | 12/2015 | Chiruta et al. |
| 2016/0115847 A1 | | 4/2016 | Chapman et al. |
| 2016/0243510 A1 | | 8/2016 | Denton et al. |
| 2016/0251990 A1 | | 9/2016 | Dimpelfeld et al. |
| 2017/0354934 A1 | | 12/2017 | Muruganantham et al. |
| 2018/0001279 A1 | | 1/2018 | De Rudder et al. |
| 2019/0209977 A1 | | 7/2019 | De Rudder et al. |
| 2020/0102856 A1 | | 4/2020 | McDeed et al. |
| 2020/0165952 A1 | | 5/2020 | Tucker et al. |

FOREIGN PATENT DOCUMENTS

| | | |
|---|---|---|
| EP | 3 085 915 A1 | 10/2016 |
| EP | 3 085 916 A1 | 10/2016 |
| EP | 3 425 180 A1 | 1/2019 |
| FR | 2972764 A1 | 9/2012 |
| FR | 2974595 A1 | 11/2012 |
| FR | 2977912 A1 | 1/2013 |
| FR | 3020835 A1 | 11/2015 |
| FR | 3020834 B1 | 6/2016 |
| FR | 3020835 B1 | 6/2016 |
| GB | 2 452 249 A | 3/2009 |
| GB | 2 512 896 A | 10/2014 |
| IN | 202047005252 A | 2/2020 |
| WO | WO-2010/146285 A1 | 12/2010 |
| WO | WO-2019/143373 A1 | 7/2019 |

OTHER PUBLICATIONS

First Examination Report for Indian Patent App. No. 202047005252 dated Mar. 18, 2021, 6 pages.
First Office Action on CN 2021104380349 dated Aug. 27, 2021.
Foreign Action other than Search Report on IN 202148042177 dated Dec. 6, 2021.
International Search Report and Written Opinion for PCT/US2018/026826, dated May 8, 2018, 6 pages.
International Search Report and Written Opinion for PCT/US2018/027580, dated Jul. 2, 2018, 7 pages.
International Search Report and Written Opinion for PCT/US2018/046680, dated Oct. 12, 2018, 6 pages.
Lee, et al., "Design and Implementation of Mixing Chambers to Improve Thermal Decomposition of Urea for NOx Abatement," Environmental Engineering Science 29(10), pp. 979-986 (2012).
Lee, J.G. et al., Design and Implementation of Mixing Chambers to Improve Thermal Decomposition of Urea for NOX Abatement. Environmental Engineering Science, 29(10), 979-986. doi:10.1089/ees.2011.0414.
Notice or Allowance on U.S. Appl. No. 16/324,485 dated Sep. 22, 2021.
Notice of Allowance on U.S. Appl. No. 16/324,485 dated Dec. 15, 2021.
Notice of Allowance on U.S. Appl. No. 29/710,948 dated Oct. 5, 2020.

* cited by examiner

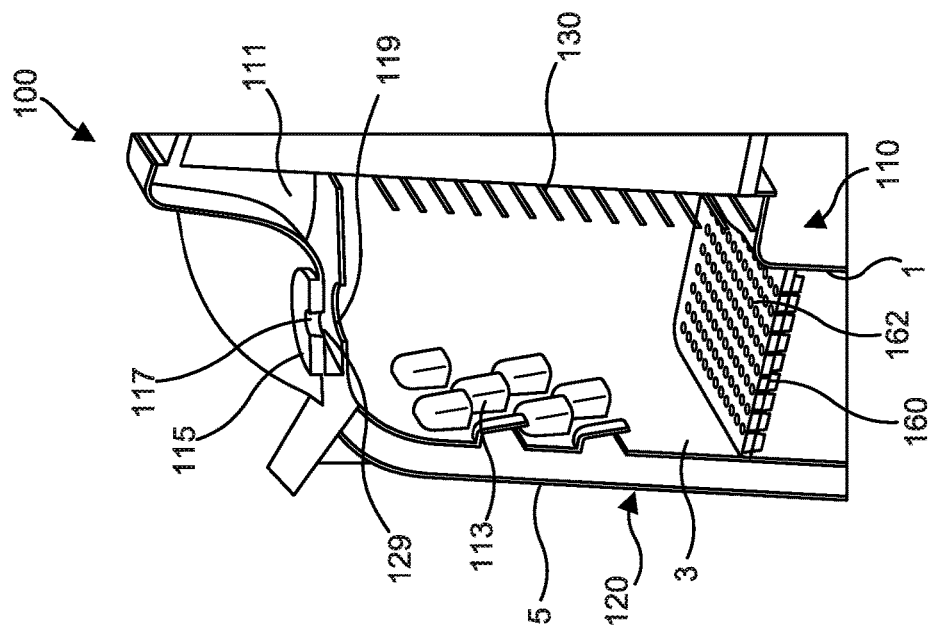
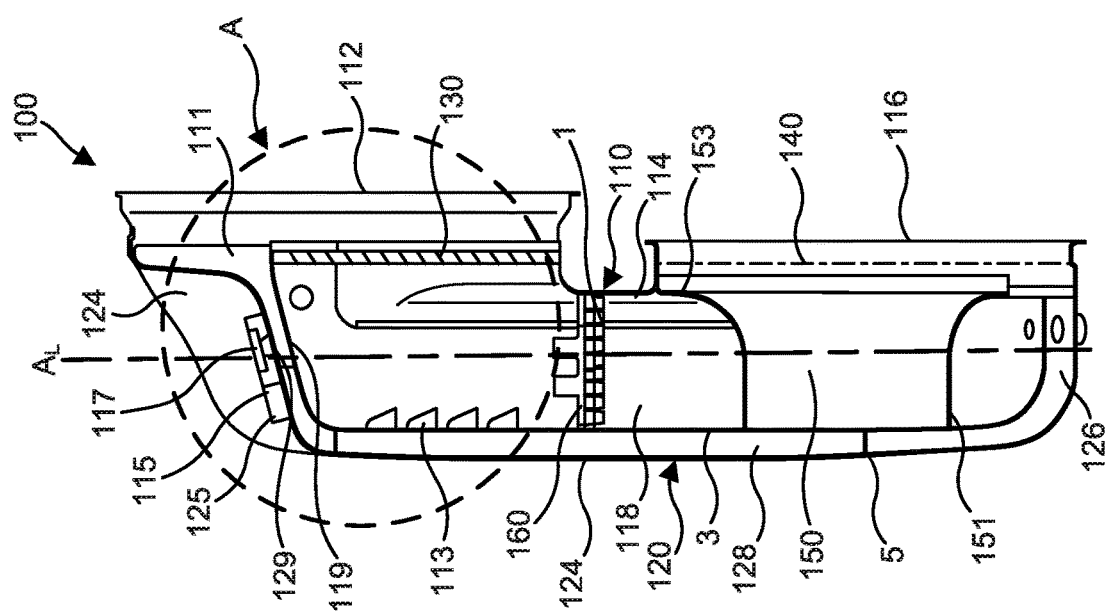
FIG. 6
FIG. 5

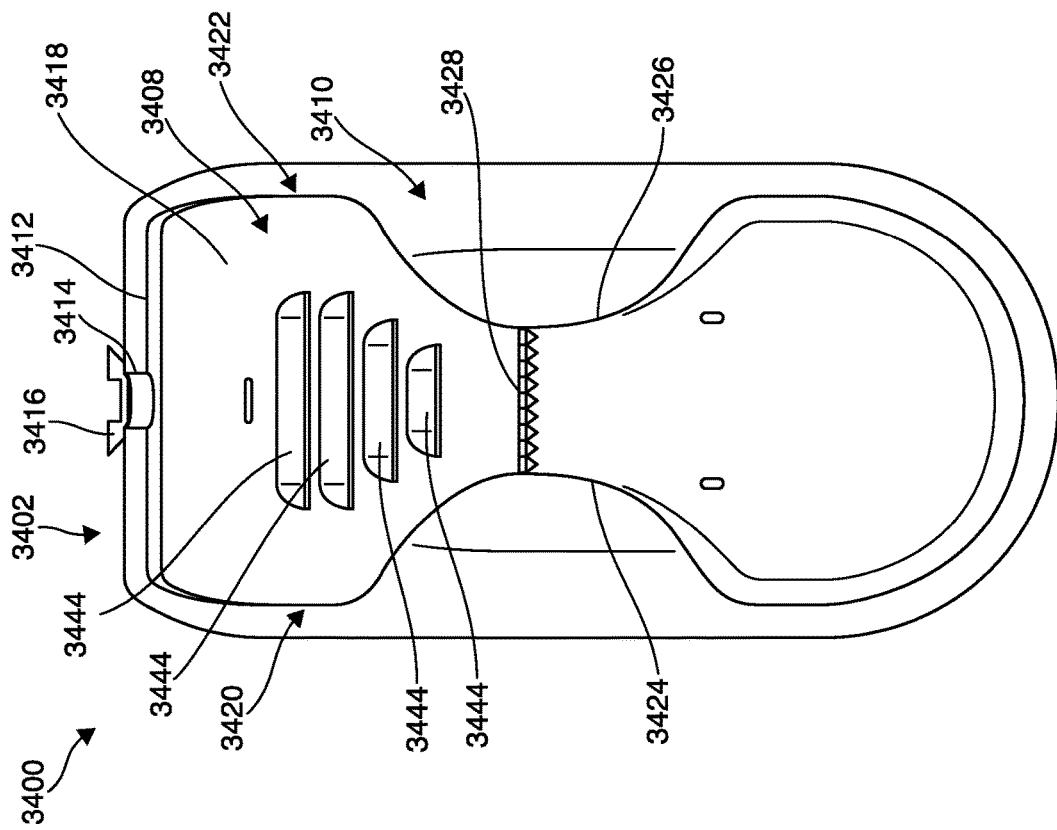
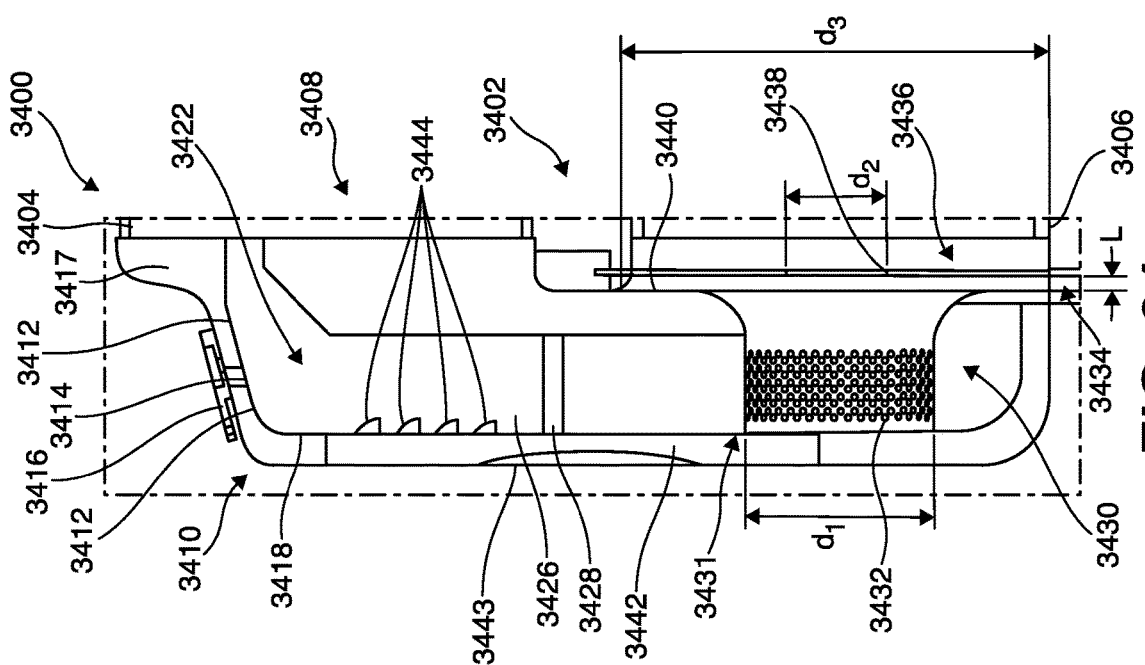

DECOMPOSITION CHAMBER FOR AFTERTREATMENT SYSTEMS

CROSS-REFERENCE TO RELATED APPLICATIONS

This application is a continuation of U.S. patent application Ser. No. 16/324,485, filed Feb. 8, 2019, which is a U.S. National Stage Application of PCT Application No. PCT/US2018/046680, filed on Aug. 14, 2018, which claims priority to Indian Provisional Patent Application No. 201841025311, filed on Jul. 6, 2018. The contents of these applications are hereby incorporated by reference in their entireties.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$).

Generally in such aftertreatment systems, an exhaust reductant (e.g., a diesel exhaust fluid such as urea) is injected into the SCR system to provide a source of ammonia and mixed with the exhaust gas to partially reduce the NOx gases. The reduction byproducts of the exhaust gas are then fluidly communicated to the catalyst included in the SCR system to decompose substantially all of the NOx gases into relatively harmless byproducts that are expelled out of the aftertreatment system.

Aftertreatment systems often include a decomposition chamber or tube upstream of the SCR system. The reductant is inserted in the decomposition chamber which serves to provide a passage to allow decomposing, mixing and distribution of the reductant with the exhaust gas before the exhaust gas flows into the SCR system. Conventional decomposition chambers have substantial axial lengths, which requires more packaging space and may also exert a higher pressure drop on the exhaust gas. Furthermore, conventional decomposition chambers experience heat loss due to inefficient thermal management which leads to formation of reductant deposits.

SUMMARY

Embodiments described herein relate generally to a decomposition chamber for use with aftertreatment systems, and in particular to a U-shaped decomposition chamber that includes a first chamber structured to receive an exhaust gas first portion, and a second chamber positioned outside the first chamber and structured to receive an exhaust gas second portion. The exhaust gas second portion flows around at least a portion of the first chamber so as to maintain a temperature of the exhaust gas first portion flowing through the first chamber.

In one embodiment, a decomposition chamber for an aftertreatment system includes a body and a diffuser. The body includes an inlet, an outlet, a thermal management chamber, and a main flow chamber. The inlet is configured to receive exhaust gas. The outlet is configured to expel the exhaust gas. The thermal management chamber is in fluid communication with the inlet. The thermal management chamber is configured to receive an exhaust gas first portion from the inlet. The main flow chamber is in fluid communication with the inlet. The main flow chamber is configured to receive an exhaust gas second portion from the inlet and to receive the exhaust gas first portion from the thermal management chamber. The diffuser is positioned within the main flow chamber. The diffuser includes a diffuser inlet portion and a diffuser flange portion. The diffuser inlet portion includes a plurality of diffuser perforations. The diffuser inlet portion is configured to receive the exhaust gas from the main flow chamber. The diffuser flange portion is configured to receive the exhaust gas from the diffuser inlet portion and provide the exhaust gas to the outlet.

In another embodiment, a decomposition chamber for an aftertreatment system, the decomposition chamber includes a body. The body includes an inlet, an outlet, a thermal management chamber, a main flow chamber, a first sidewall, and a second sidewall. The inlet is configured to receive exhaust gas. The outlet is configured to expel the exhaust gas. The thermal management chamber is in fluid communication with the inlet. The thermal management chamber is configured to receive an exhaust gas first portion from the inlet. The main flow chamber is in fluid communication with the inlet. The main flow chamber is configured to receive an exhaust gas second portion from the inlet and to receive the exhaust gas first portion from the thermal management chamber. The main flow chamber includes a first sidewall and a second sidewall. The first sidewall includes a first convex portion. The second sidewall includes a second convex portion. The first convex portion and the second convex portion cooperate to constrict the exhaust gas therebetween. The first convex portion is aligned with the second convex portion. The first convex portion and the second convex portion are opposed to each other so as to form a constricted region in the main flow chamber.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIG. 5 is a side cross-section view of the decomposition chamber of FIG. 1.

FIG. 6 is another side cross-section view of a portion of the decomposition chamber of FIG. 1.

FIG. 34 is a side cross-section view of a decomposition chamber, according to yet another embodiment.

FIG. 35 is a front cross-section view of the decomposition chamber of FIG. 34.

Figure 2:
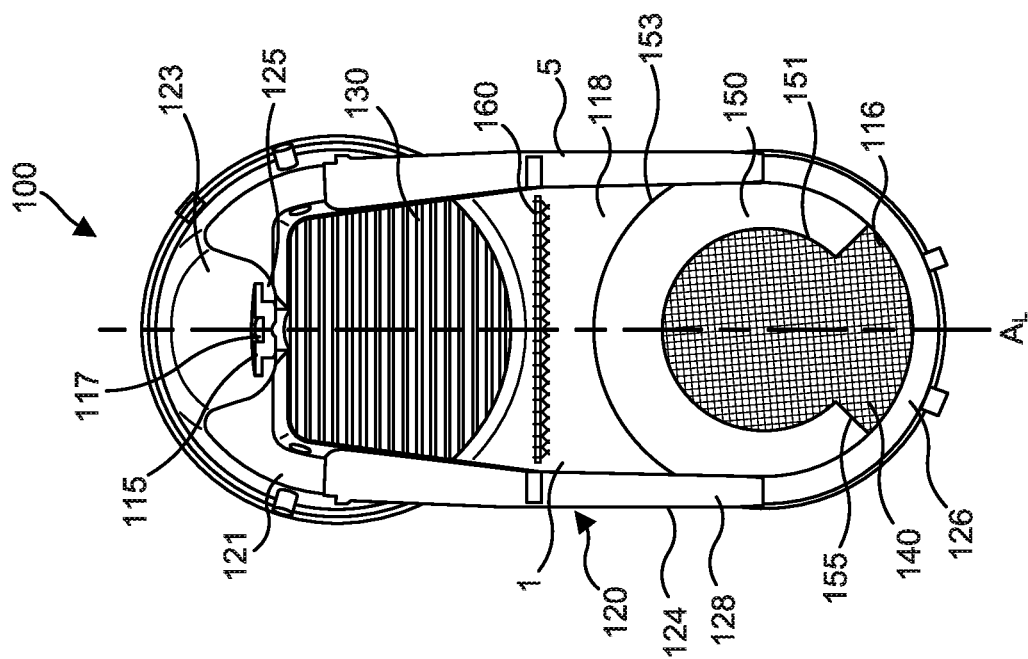
FIG. 2 is a rear cross-section view of the decomposition chamber of FIG. 1.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to a decomposition chamber for use with aftertreatment systems, and in particular to a U-shaped decomposition chamber that includes a first chamber structured to receive an exhaust gas first portion, and a second chamber positioned outside the first chamber and structured to receive an exhaust gas second portion. The exhaust gas second portion flows around at least a portion of the first chamber so as to maintain a temperature of the exhaust gas first portion flowing through the first chamber.

Aftertreatment systems often include a decomposition chamber or chamber upstream of the SCR system. The reductant is inserted in the decomposition chamber which serves to provide a passage to allow decomposing, mixing and distribution of the reductant with the exhaust gas before the exhaust gas flows into the SCR system. Conventional decomposition chambers have a substantial axial length which requires more packaging space and may also exert a higher pressure drop on the exhaust gas. Furthermore, conventional decomposition chambers experience heat loss due to inefficient thermal management which leads to formation of reductant deposits.

Various embodiments of the decomposition chamber described herein may provide benefits including, for example: (1) thermal management of a temperature of the exhaust gas flowing through the decomposition chamber; (2) providing controlled mass flow split; (3) providing swirl generation in the exhaust gas so as to enhance mixing of a reductant with the exhaust gas; (4) shielding a reductant injector from higher exhaust gas temperatures within the decomposition chamber; (5) enhancing decomposing, mixing and distribution of the reductant with the exhaust gas, thereby reducing reductant deposits; (6) maximizing a uniformity index and reductant evaporation to minimize reductant deposits; and (7) providing a compact packaging which reduces space claim on an aftertreatment system including the decomposition chamber described herein, as well as reduces cost.

FIGS. 1-6 show various views of a decomposition chamber 100, according to an embodiment. The decomposition chamber 100 comprises a first wall 1, a second wall 3, a third wall 5, a first chamber 110 formed between the first wall 1 and the second wall 3, and a second chamber 120 formed by the second wall 3 and the third wall 5. The decomposition chamber 100 is structured to receive an exhaust gas (e.g., a diesel exhaust gas) from an engine (e.g., a diesel, a gasoline, a biodiesel, a natural gas, and/or a dual-fuel engine), and allow mixing of the reductant with the exhaust gas before communicating the exhaust gas to an SCR system.

As best shown in FIG. 5, the first chamber 110 comprises a first plenum 114 defined between the first wall 1 and the second wall 3. The first plenum 114 is positioned along a longitudinal axis $A_L$ of the decomposition chamber 100. The first plenum 114 defines a first plenum internal volume 118. The first plenum 114 may have any suitable shape, for example spherical, square, rectangular, or any other suitable shape or combination thereof, and may be formed from any suitable material (e.g., metals such as aluminum, stainless steel, alloys, etc.) A first inlet 112 is defined at a first end of the first plenum 114. The first inlet 112 is structured to receive an exhaust gas first portion of the exhaust gas in a first direction perpendicular to the longitudinal axis $A_L$. For example, the first inlet 112 may be fluidly coupled to an engine exhaust of the engine so as to receive the exhaust gas first portion therefrom. In other embodiments, the first inlet 112 may be oriented at any suitable angle relative to the longitudinal axis, for example any angle between 0 degrees and 360 degrees.

Figure 10:
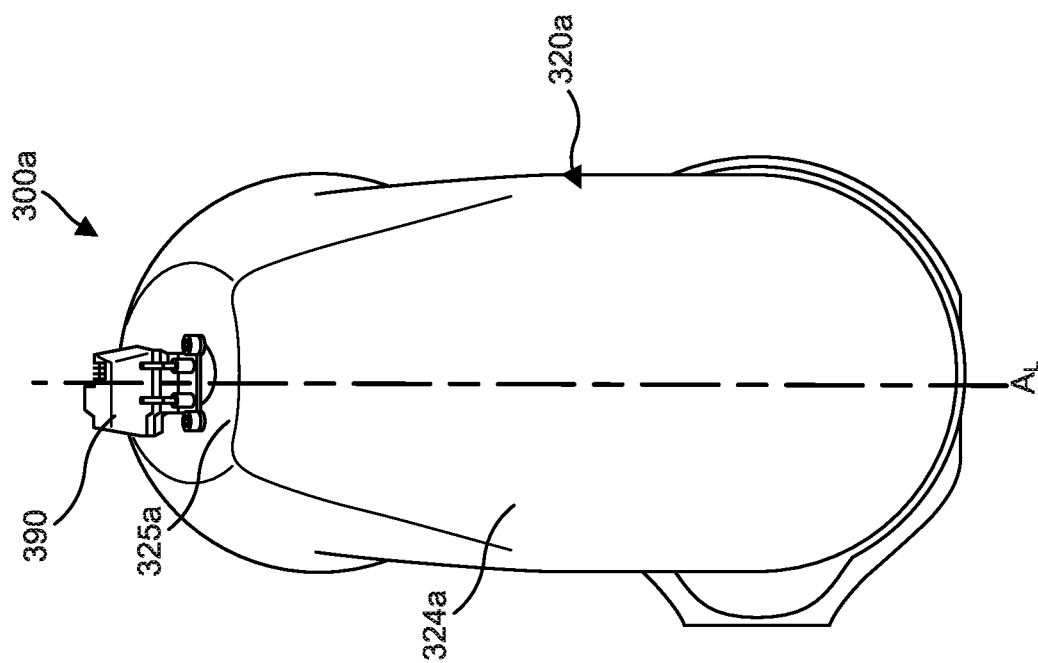
FIG. 10 is a rear view of a decomposition chamber, according to yet another embodiment.

A first reductant insertion port 119 is also defined in the second wall 3 proximate to the first inlet 112. An injector (e.g., the injector 390 shown in FIGS. 10-11), may be fluidly coupled to the first reductant insertion port 119 through a second reductant insertion port 129 defined in a second plenum 124 of the second chamber 120, as described below in further detail, and configured to insert a reductant (e.g., urea, a diesel exhaust fluid, an aqueous urea solution, gaseous urea, ammonia, etc.) in the first plenum internal volume 118. The reductant mixes with the exhaust gas flowing into the first plenum internal volume 118 so as to facilitate decomposition of constituents of the exhaust gas, for example NOx gases included in the exhaust gas.

A first outlet 116 is also defined on a second end of the first plenum 114 opposite the first end between the first wall 1 and the second wall 3. The first outlet 116 is structured to allow the exhaust gas to exit the first plenum 114 in a second direction opposite the first direction perpendicular to the longitudinal axis $A_L$. In other embodiments, the first inlet 112 may be oriented at any suitable angle relative to the longitudinal axis, for example any angle between 0 degrees and 360 degrees. In other words, the decomposition chamber 100 is substantially U-shaped. The first outlet 116 may be fluidly coupled to the SCR system so as to communicate the exhaust gas thereto. In this manner, the decomposition chamber 100 may have a compact size which requires lesser packaging space compared to conventional decomposition chambers, as well as exerts less pressure drop on the exhaust gas as it flows through the first plenum 114. A second flange 4 may be positioned at the outlet and structured to couple the first outlet 116 to an aftertreatment component (e.g., the SCR system)

In particular embodiments, a plurality of baffles 130 may be positioned on the first inlet 112. The plurality of baffles 130 may be structured to guide the flow of the exhaust gas into the first plenum internal volume 118. By guiding the flow, the plurality of baffles 130 prevent reductant deposits from impacting any aftertreatment component positioned upstream of the first inlet 112 (e.g., a particulate filter). The plurality of baffles 130 may also manage an exhaust gas flow, for example by varying an opening between each of the plurality of baffles 130 and/or an angle of inclination of the plurality of baffles 130, allow a reductant spray to develop, and enable distribution of the reductant deposits uniformly across a width of the first plenum 114.

Figure 4:
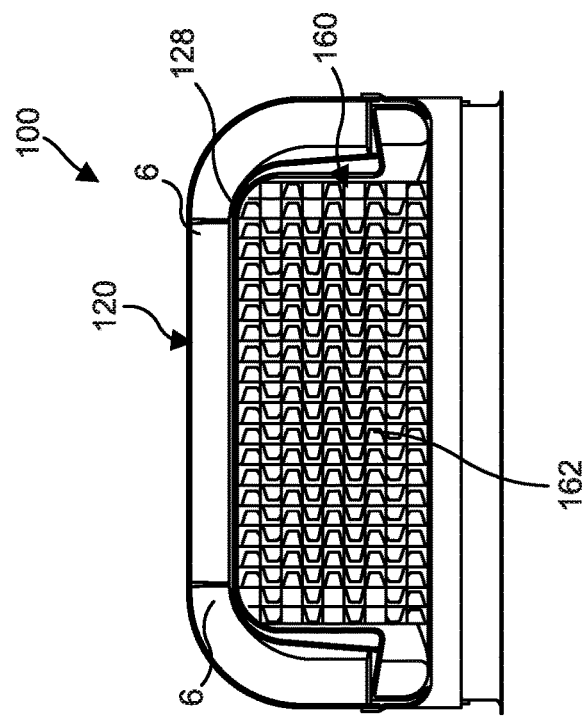
FIG. 4 is a top cross-section view of the decomposition chamber of FIG. 1.
Figure 3:
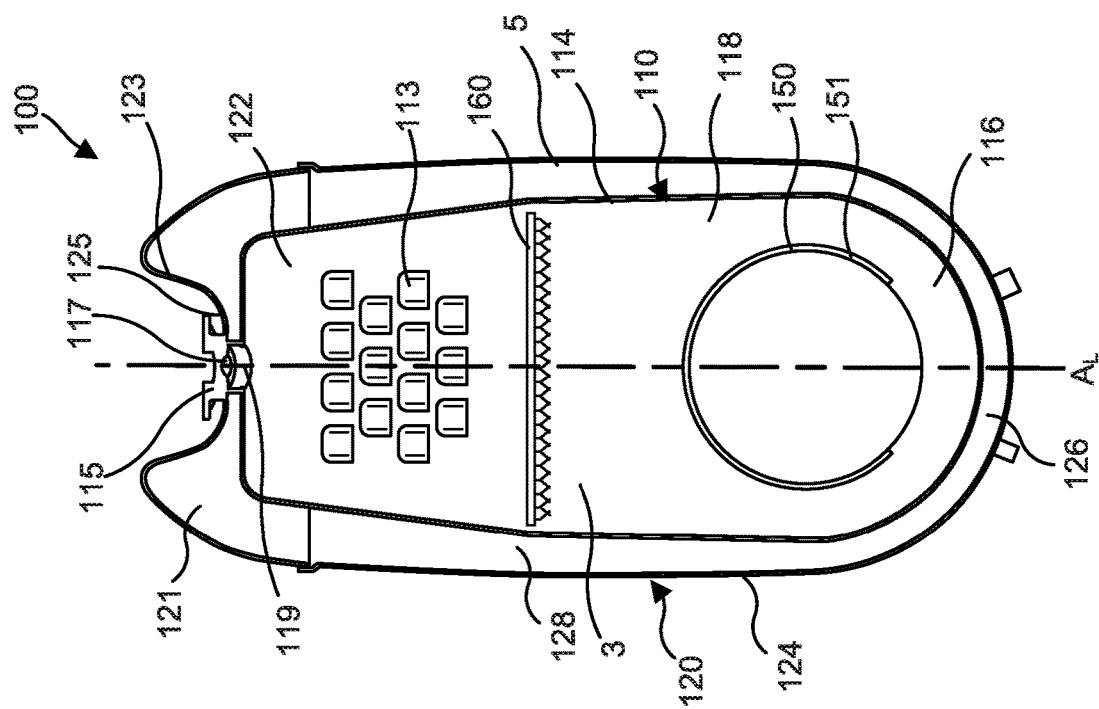
FIG. 3 is a front cross-section view of the decomposition chamber of FIG. 1.
Figure 7:
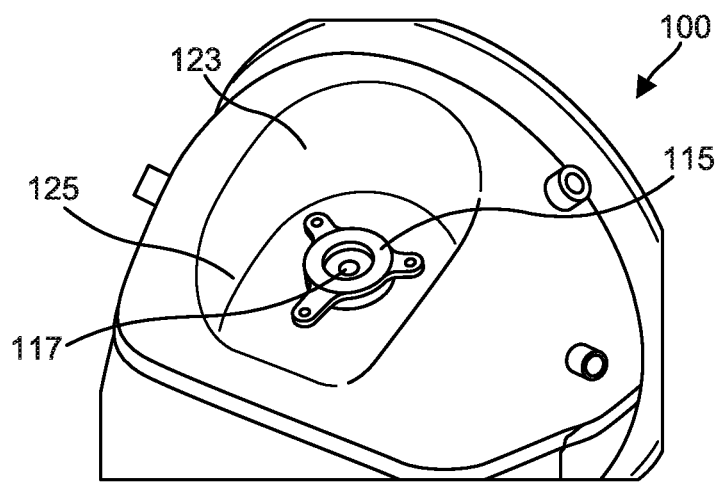
FIG. 7 is a top perspective view of a portion of the decomposition chamber of FIG. 1 showing a mounting plate positioned thereon.

In some embodiments, a mixer 160 may be positioned within the first plenum internal volume 118 downstream of the first reductant insertion port 119, for example midway within the exhaust gas flow path defined by the first plenum internal volume 118. The mixer 160 may include a cross-vaned mixer comprising a plurality of tabs 162, as shown in FIG. 4. The mixer 160 is structured to uniformly distribute exhaust gas flow mixed with reductant across a width of the first plenum 114, enable secondary atomization of reductant droplets, prevent recirculation and/or flow separation due to sharp change in exhaust gas flow direction of the exhaust gas first portion as it enters the first plenum 114 from the first inlet 112, and improves flow distribution thereby reducing reductant deposits. The location of the mixer 160 may allow for a spray cone of the reductant to properly develop, and in turn ensures maximum utilization of the mixer 160 for droplet breakup. The mixer 160 may also increase an exhaust gas flow velocity of the exhaust gas first portion, which may shear reductant droplets and enable secondary atomization, and thereby improve reductant evaporation.

In other embodiments, a diffuser 150 may be positioned in the first plenum internal volume 118 proximate to the first outlet 116. The diffuser 150 comprises a diffuser first end 151 coupled to the second wall 3 and defining a first cross-section. A diffuser second end 153 is coupled to the first outlet 116 and defines a second cross-section larger than the first cross-section. At least a portion of the diffuser 150 proximate to the diffuser second end 153 defines a curvature. For example, a portion of the diffuser 150 may be cylindrical having a constant cross-section extending from the diffuser first end 151 towards the diffuser second end 153. A second portion of the diffuser 150 may flare outwards (e.g., curve outwards or slant outwards) from the diffuser first portion towards the first outlet 116. In other embodiments, the diffuser 150 may be positioned such that a gap exists between the diffuser first end 151 and the second wall 3, for example to allow a portion of the exhaust gas to flow in the gap so improve uniformity, reduce reductant deposit formation and/or reduce backpressure In particular embodiments, the gap may be in a range of 1 mm to 5 mm (e.g., 1, 1.5, 2, 2.5, 3, 3.5, 4, 4.5 or 5 mm, inclusive of all ranges and values therebetween).

A diffuser opening 155 is defined in the diffuser 150 proximate to the second end of the first plenum 114. The diffuser opening 155 is structured to allow the exhaust gas first portion flowing around the diffuser 150 to enter into the diffuser 150 and exit through the first outlet 116. Positioning of the diffuser 150 proximate to the first outlet 116 locates the diffuser 150 just upstream of the SCR system which may be fluidly coupled to the first outlet 116. The diffuser 150 increases the distance travelled by the exhaust gas first portion, thereby increasing mixing of the reductant with the exhaust gas, enhancing evaporation of reductant droplets, and may further facilitate atomization of reductant droplets by increasing the turbulence and flow velocity of the exhaust gas first portion. In particular embodiments, the diffuser 150 may be configured to allow all of the exhaust gas including the exhaust gas first portion, an exhaust gas second portion flowing through a second plenum 124, and an exhaust gas third portion flowing through a third plenum 122 (described below in further detail herein) therethrough.

As the exhaust gas first portion flows around the diffuser 150 towards the first outlet 116, opposing stream of the exhaust gas first portion flow around the diffuser 150 and rejoin on entering the diffuser 150 through the diffuser opening 155. The opposing streams collide within the diffuser 150 which further enhances atomization of the reductant droplets, and may also elevate the exhaust gas flow. In various embodiments, the diffuser 150 may include openings, perforations, slots, louvers, etc. to increase uniformity of exhaust gas flow towards the SCR system and reduce flow restriction. Positioning and location of the openings or perforations may be positioned to change the flow velocity vectors to enhance mixing, the size of the opening may be varied to achieve optimal flow velocities, and/or the shape of the diffuser 150 may be changed or rotated to decrease or increase the diffuser opening 155, as described in further detail below herein.

Figure 1:
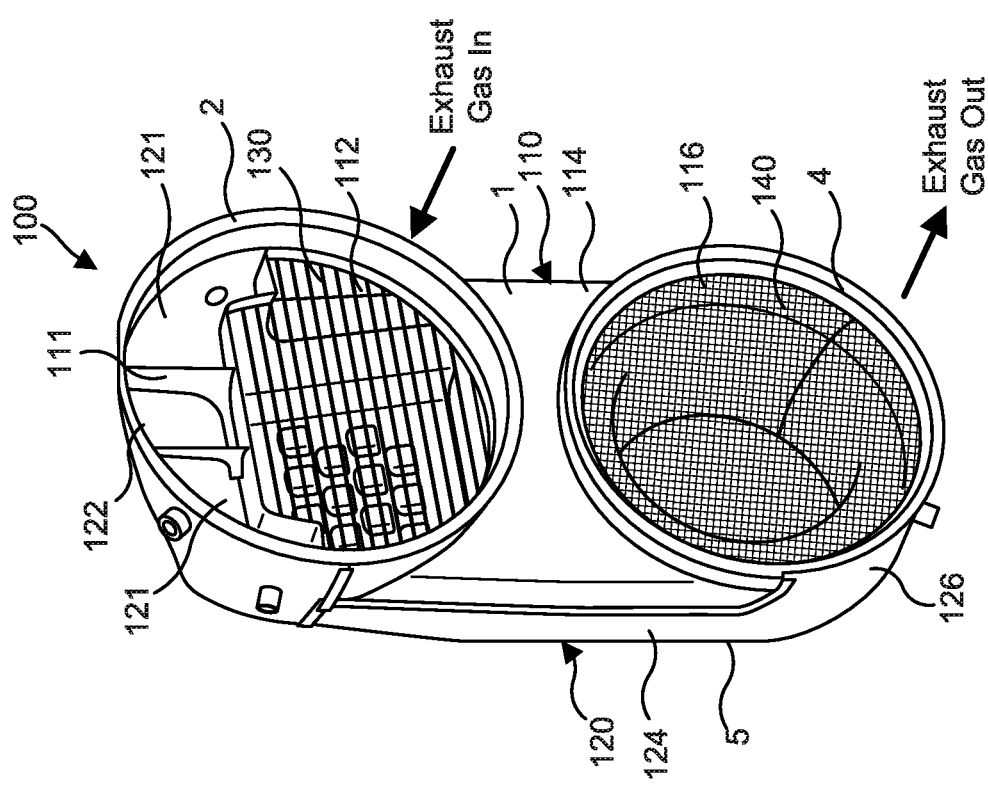
FIG. 1 is a perspective view of a decomposition chamber, according to an embodiment.

In still another embodiment, a perforated plate 140 may be positioned at the first outlet 116. The perforated plate 140 may prevent any reductant deposits from flowing into the SCR system. Furthermore, the perforated plate 140 may also serve as a secondary flow conditioning device so as to manage flow restriction, distribution, uniformity, and/or reductant droplet distribution. While FIG. 1 shows the perforated plate 140 as including a straight perforated plate, in other embodiments, the perforated plate 140 may have a concave or convex shape so as to produce a desired flow of the exhaust gas first portion. Furthermore, the perforated plate 140 may have a uniform or non-uniform pattern of the perforations included therein.

The decomposition chamber 100 also comprises a second chamber 120 coupled to the first chamber 110. The second chamber 120 comprises a second plenum 124 defined between the second wall 3 and the third wall 5 and positioned along the longitudinal axis $A_L$ of the decomposition chamber 100 such that the second plenum 124 is positioned around at least a portion of the first plenum 114. The second plenum 124 defines a second plenum internal volume 128, and a second inlet 121 defined between the second wall 3 and the third wall 5 to the first inlet 112. The second inlet 121 is structured to receive an exhaust gas second portion of the exhaust gas. The exhaust gas second portion flows into the second plenum 124 around the first plenum 114 so as to maintain a temperature of the exhaust gas first portion flowing through the first plenum internal volume 118.

Expanding further, the second chamber 120 serves as a jacket positioned around at least a portion of the first chamber 110. The first inlet 112 of the first plenum 114, and the second inlet 121 of the second plenum 124 are positioned adjacent to each other and fluidly coupled to a source of the exhaust gas, for example to the engine exhaust. In some embodiments, a first flange 2 may be coupled to each of the first inlet 112 and the second inlet 121 so as to provide a single fluid coupling with the engine exhaust and fluidly couple each of the first inlet 112 and the second inlet 121 to the engine exhaust.

As the exhaust gas enters the decomposition chamber 100, the exhaust gas splits into the exhaust gas first portion flowing into the first inlet 112, and an exhaust gas second portion flowing into the second inlet 121 towards the second plenum internal volume 128. The exhaust gas second portion enables thermal management of the first plenum 114 by keeping the first plenum sidewall at a desired temperature. This reduces reductant deposits particularly in areas where the reductant impinges on the first plenum sidewall.

In some embodiments, a plurality of guiding baffles 6 may be positioned in the second plenum 124, as shown in FIG. 4. The plurality of guiding baffles 6 may facilitate uniform spreading of the exhaust gas second portion within the second plenum internal volume 128 so as to keep the entire second plenum internal volume 128, or specific areas therewithin at a desired temperature. In still other embodiments, a plurality of louvers 113 may be defined on the second wall 3 in the first plenum 114 downstream of the first inlet 112, and upstream of the mixer 160. The plurality of louvers 113 fluidly couple the second plenum 124 to the first plenum 114.

The plurality of guiding baffles 6 may guide the exhaust gas second portion flow from the sides of the second plenum 124 to the plurality of louvers 113. In particular embodiments, the plurality of louvers 113 may comprise a plurality of perforations or perforated cones as shown in FIGS. 1-3, and 5-6. Positioning of the louvers 113 on the first plenum sidewall creates a bed of the exhaust gas second portion on the first plenum sidewall proximate to the first reductant insertion port 119, which may decrease impingement of the reductant on the first plenum sidewall. Since the exhaust gas second portion does not include any reductant, upstream introduction thereof may increase mixing of the reductant with the exhaust gas, facilitate evaporation and thereby, improve uniformity.

Figure 17:
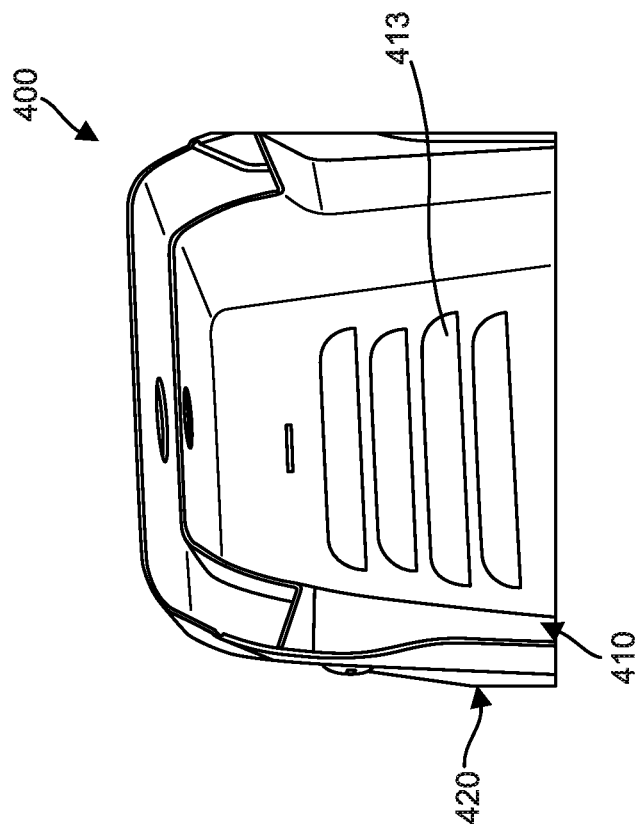
FIG. 17 is a front cross-section view of a portion of the decomposition chamber of FIG. 16.
Figure 16:
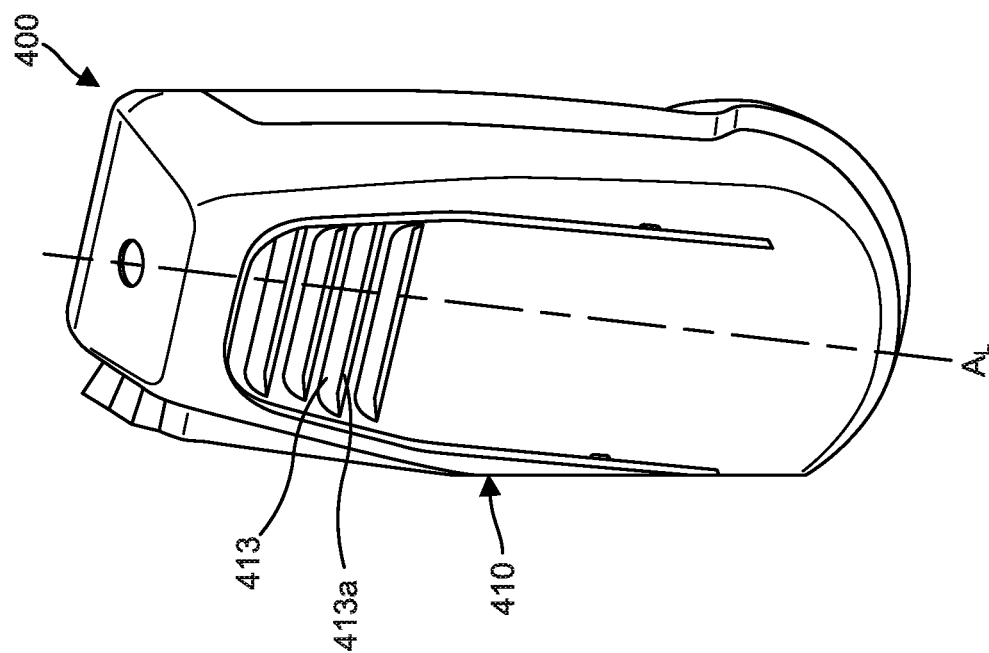
FIG. 16 is a rear view of a first plenum of a decomposition chamber, according to another embodiment.

A quantity and/or open areas of the plurality of louvers 113 may be adjusted to adjust flow restriction, and/or impingement. Furthermore, the location of the plurality of louvers 113 may be adjusted based on impingement zones and/or mixing requirements. FIGS. 16-17 show a decomposition chamber 400 according to another embodiment. A plurality of louvers 413 are defined on a first plenum sidewall of a first plenum of a first chamber 410 of the decomposition chamber 400, fluidly couple a second plenum of a second chamber 420 to a first plenum of the first chamber 410 via a plurality of openings 413a defined in the first plenum sidewall. The plurality of louvers 413 comprise longitudinal louvers positioned perpendicular to a longitudinal axis of the decomposition chamber 400 on the first plenum sidewall.

In other embodiments, slots, diverters, perforated cones, or any other features may be defined on the first plenum sidewall for fluidly coupling the second plenum 124 thereto. Furthermore, the second plenum internal volume 128, and/or a gap between the first plenum sidewall and the second plenum sidewall may be varied to adjust reductant insertion rate, and/or exhaust gas flow rates.

As previous described, the second reductant insertion port 129 is defined in the second plenum 124 proximate to the first reductant insertion port 119 as shown in FIGS. 2-3 and 5-7. For example, the first reductant insertion port 119 and the second reductant insertion port 129 may be axially aligned. An injector mounting plate 115 may be positioned in the second reductant insertion port 129, and structured to mount an injector (e.g., the injector 390 shown in FIGS. 10-11) thereon. The injector mounting plate 115 defines an aperture 117 structured to allow inserting of the reductant into the first plenum internal volume 118.

Figure 15:
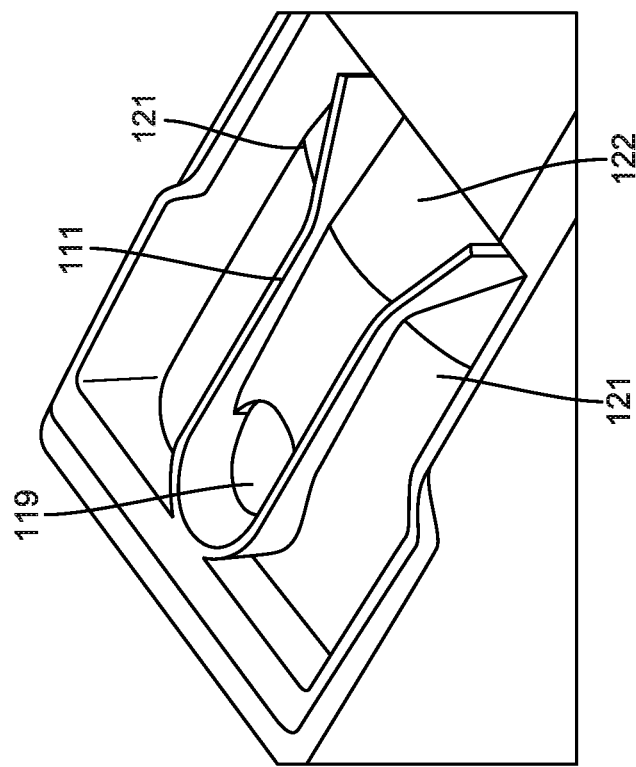
FIG. 15 is a top cross-section view of a portion of the decomposition chamber of FIG. 1.
Figure 14:
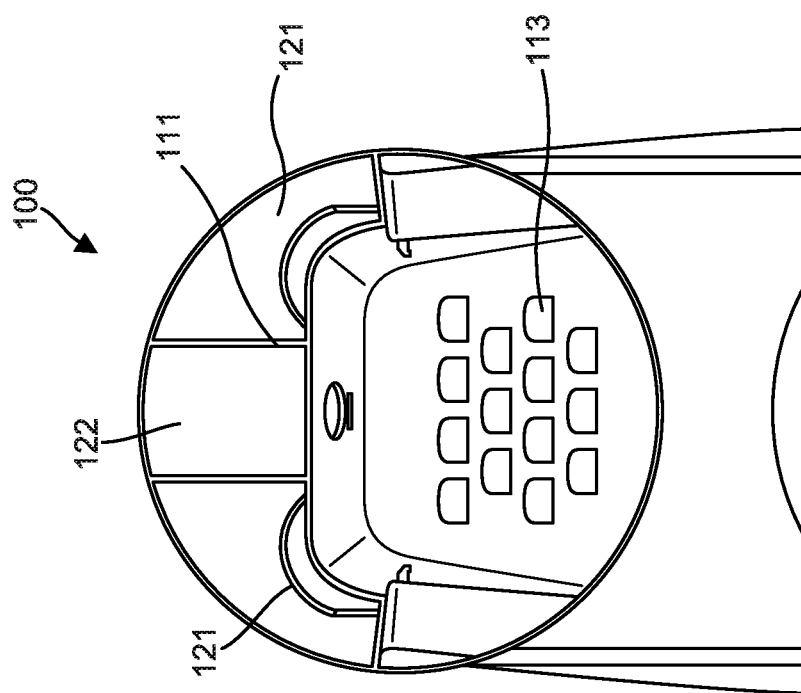
FIG. 14 is a front cross-section view of a portion of the decomposition chamber of FIG. 1.

In some embodiments, the decomposition chamber 100 also comprises a third plenum 122. Referring also now to FIGS. 14 and 15, a U-shaped divider 111 may be positioned in the second inlet 121 around the first reductant insertion port 119 and the second reductant insertion port 129, such that the divider 111 defines the third plenum 122 around the first reductant insertion port 119 and the second reductant insertion port 129. The third plenum 122 is structured to receive an exhaust gas third portion and to thermally isolate the injector fluidly coupled to the first reductant insertion port 119 and the second reductant insertion port 129 from the first plenum 114.

In particular embodiments, the injector inserts the reductant into the third plenum 122. The exhaust gas third portion flowing into the third plenum 122 may assist reductant flow into the first plenum internal volume 118 (i.e., provide exhaust assisted reductant insertion), ensuring proper reductant flow velocities so as to help develop the reductant spray and facilitate penetration into the exhaust gas first portion. Furthermore, flow of the exhaust gas third portion into the third plenum 122 may provide a thermal shield for the injector from the higher temperature of the first plenum 114 and maintain a temperature of an injector tip (e.g., a reductant insertion nozzle) below a temperature threshold. The exhaust gas third portion may also carry away reductant droplets accumulated around the injector tip, thereby avoiding reductant deposits from forming on the injector tip.

In still other embodiments, the first reductant insertion port 119 may have a larger cross-section than a cross-section of the second reductant insertion port 129, and may be inclined at an angle relative to the longitudinal axis $A_L$. The larger cross-section of the first reductant insertion port 119 and inclination thereof may facilitate larger flow rate and increase reductant insertion velocity assisted by the exhaust gas third portion flow.

The second chamber 120 may have structures or features for mounting the injector mounting plate 115 and/or the injector. In one embodiment shown in FIGS. 1-7, the second chamber 120 may comprise a recess 123 defined by the second plenum sidewall around the second reductant insertion port 129. The recess 123 comprises a recess base 125 in which the second reductant insertion port 129 is defined. The recess 123 may be structured such that the injector positioned on the injector mounting plate 115 is at least partially surrounded by a recess sidewall of the recess 123 so as to protect the injector from physical damage. The recess 123 reduces a distance between the point of reductant insertion through the second reductant insertion port 129, and the first reductant insertion port 119, so as to facilitate exhaust gas assisted reductant insertion via the exhaust gas third portion.

Figure 8:
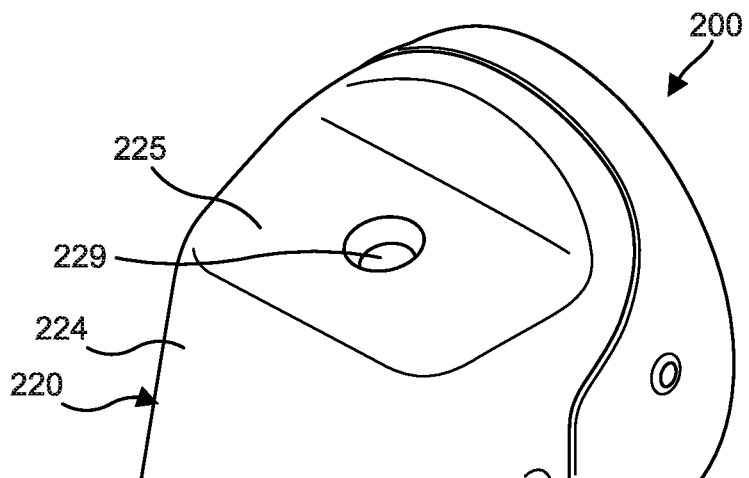
FIG. 8 is a top perspective view of a portion of a decomposition chamber, according to another embodiment.
Figure 9:
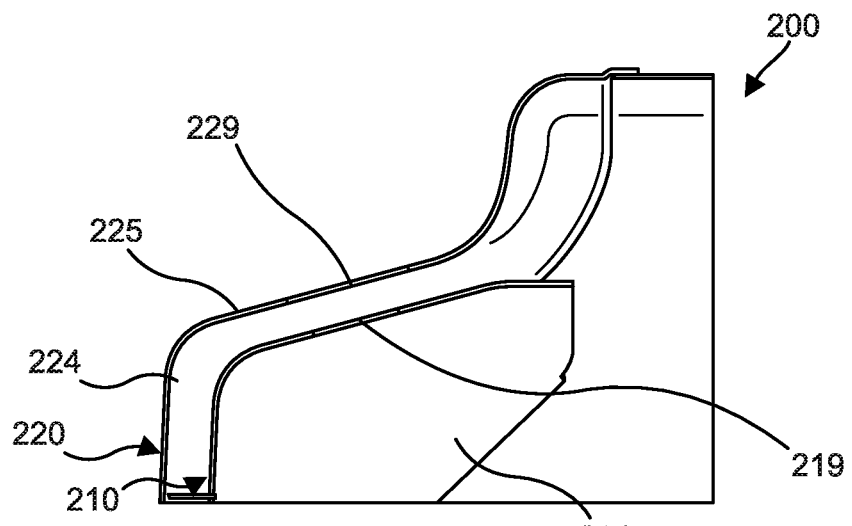
FIG. 9 is a side cross-section view of the portion of the decomposition chamber of FIG. 8.

FIG. 8 shows a top perspective view, and FIG. 9 shows a side cross-section view of a portion of a decomposition chamber 200, according to another embodiment. The decomposition chamber 200 comprises a first chamber 210 having a first plenum 214, and a second chamber 220 having a second plenum 224. A first reductant insertion port 219 is defined in the first plenum 214. The second plenum 224 comprises an injector mount portion 225 which includes a flattened surface for mounting the injector. A second reductant insertion port 229 is defined in the injector mount portion 225.

The injector may be mounted at any suitable location proximate to the first inlet 112 of the decomposition chamber 100. According to a particular embodiment shown in FIG. 10, a decomposition chamber 300a comprises a second chamber 320a including a second plenum 324a. The second plenum 324a defines an injector mount portion 325a which is relatively flat. An injector 390 is mounted on the injector mount portion 325a, which is positioned such that the injector is axially aligned with the longitudinal axis $A_L$.

Figure 11:
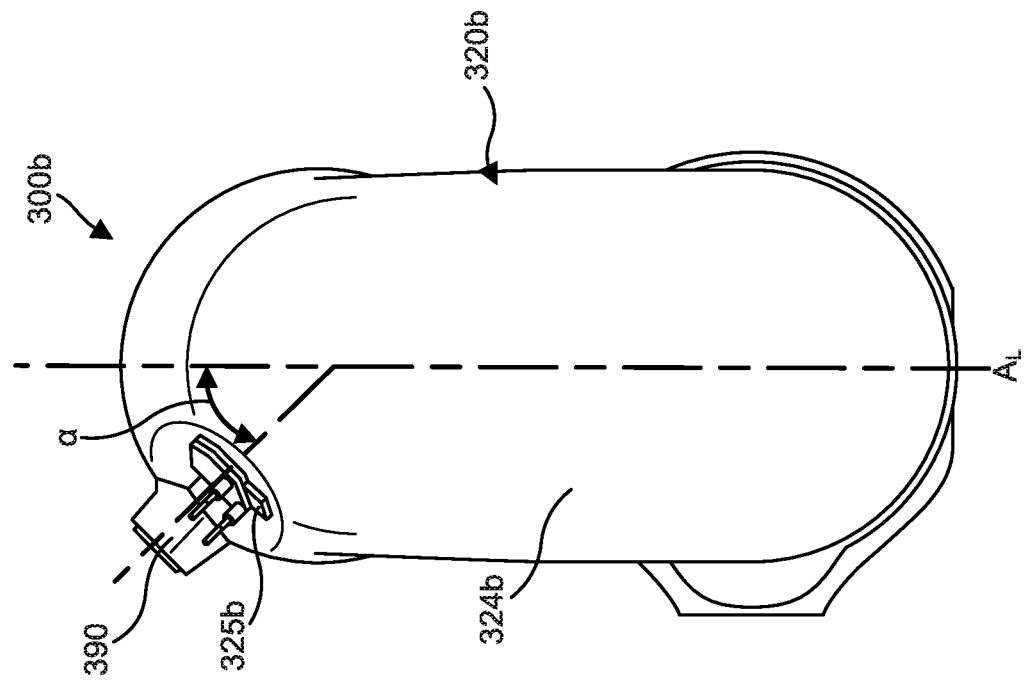
FIG. 11 is a rear view of a decomposition chamber, according to still another embodiment.

According to another embodiment shown in FIG. 11, a decomposition chamber 300b comprises a second chamber 320b including a second plenum 324b. The second plenum 324b also defines a flat injector mount portion 325b. However, the second plenum 324b is located such that the injector 390 mounted thereon, is inclined or oriented at an angle α (e.g., in the range of ±90 degrees) with respect to the longitudinal axis $A_L$. Inclining the injector 390 with respect to a flow direction of the exhaust gas may facilitate smoothening of the exhaust gas flow, and/or avoid reductant deposit generation on the first plenum sidewall or corners thereof. Furthermore, the flattened injector mount portion 225, 325a/b may also reduce the space occupied by the decomposition chamber 100, 300a/b when packaged with an aftertreatment system.

Figure 13:
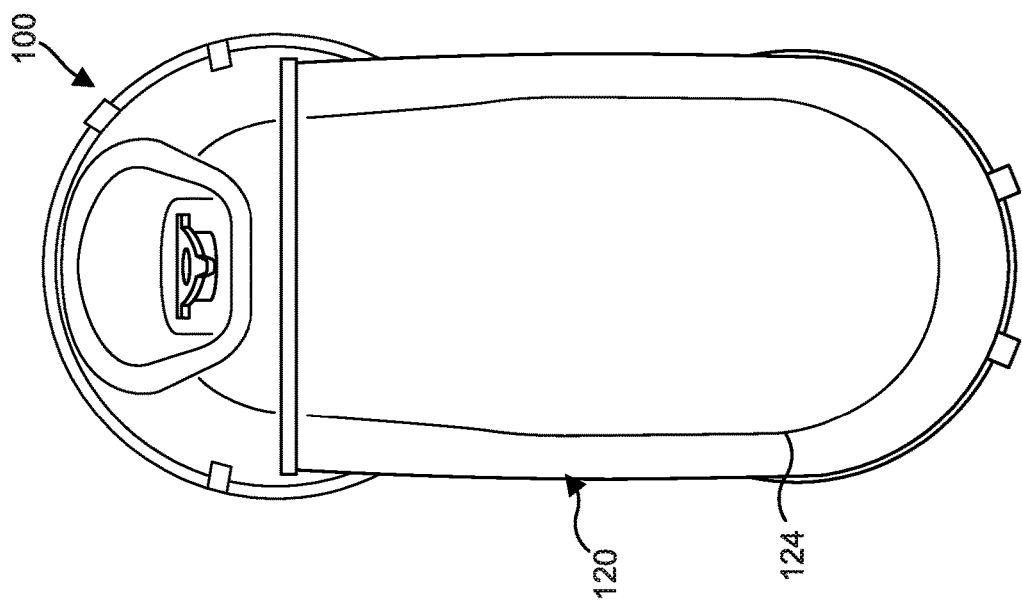
FIG. 13 is a rear view of the decomposition chamber of FIG. 1.
Figure 12:
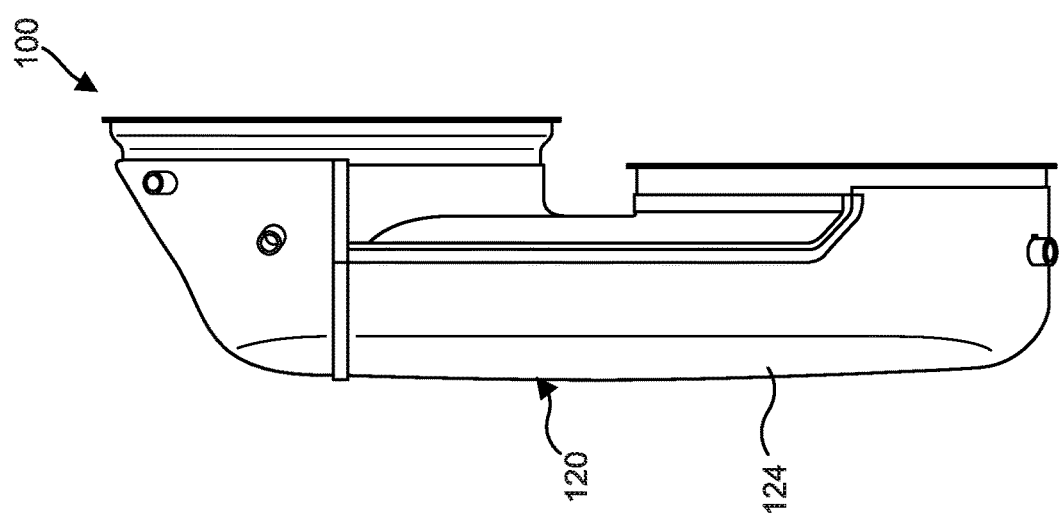
FIG. 12 is a side view of the decomposition chamber of FIG. 1.

In various embodiments, the decomposition chamber 100 or any other decomposition chamber described herein may have smooth corners for ease of packaging. For example, FIG. 12 shows a side view and FIG. 13 shows a rear view of the decomposition chamber 100. The second plenum sidewall of the second plenum 124 includes smooth rounded corners (e.g., the second chamber 120 is molded to have the smooth rounded corners), which may provide ease of handling and facilitate package.

Figure 19:
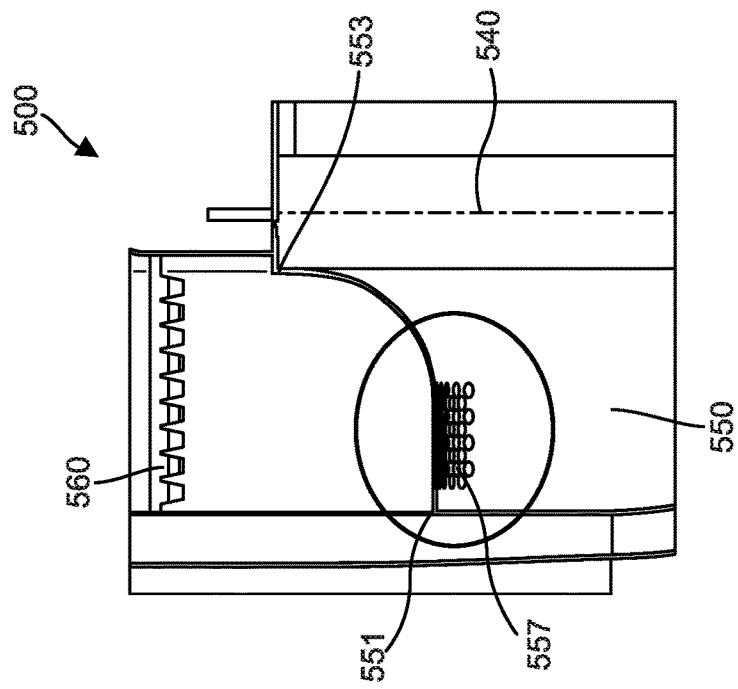
FIG. 19 is an enlarged view of a portion of the decomposition chamber shown in FIG. 18.
Figure 18:
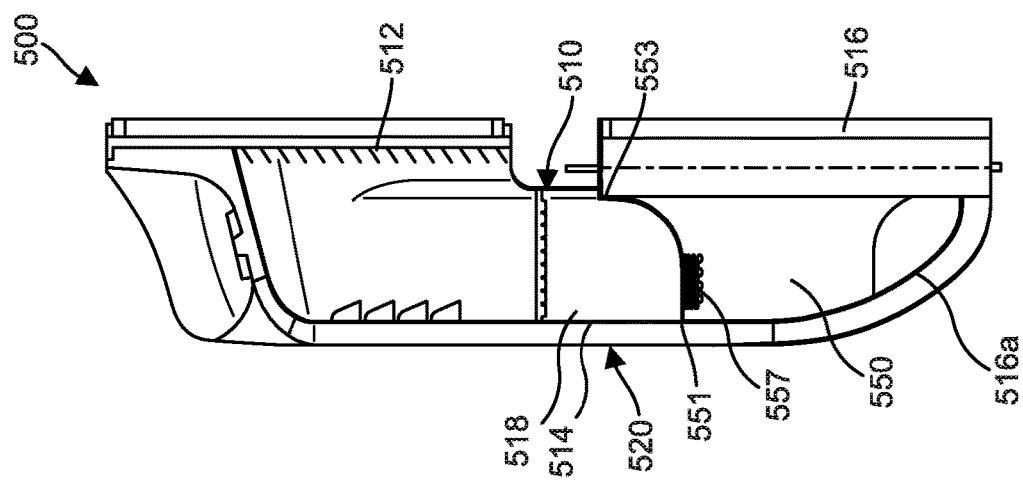
FIG. 18 is a side cross-section view of a decomposition chamber, according to another embodiment.

As described previously, the diffuser 150 may include open areas, perforations, slots, louvers, etc. to increase uniformity of exhaust gas flow towards the SCR system and reduce flow restriction. FIG. 18 shows a side cross section view of a decomposition chamber 500 according to an embodiment, and FIG. 19 shows an enlarged view of a portion thereof. The decomposition chamber 500 comprises a first chamber 510 and a second chamber 520. The first chamber 510 comprises a first inlet 512, a first plenum 514 defining a first plenum internal volume 518, and a first outlet 516.

A diffuser 550 is positioned within the first plenum internal volume 518. The diffuser 550 comprises a diffuser first end 551 which defines a first cross-section. The diffuser first end 551 is positioned such that a gap exists between the first plenum sidewall of the first plenum 514 and the diffuser first end 551. In particular embodiments, the gap may be in a range of 1 mm to 5 mm (e.g., 1, 1.5, 2, 2.5, 3, 3.5, 4, 4.5 or 5 mm, inclusive of all ranges and values therebetween). A diffuser second end 553 is coupled to the first outlet 516 and defines a second cross-section larger than the first cross-section. A diffuser first portion of the diffuser 550 is cylindrical having a constant cross-section extending from the diffuser first end 551 towards the diffuser second end 553. A diffuser second portion of the diffuser 550 curves outwards towards the first outlet 516.

A plurality of first perforations 557 are defined on the diffuser first portion, and may span less than half a circumference of the diffuser first portion. The plurality of first perforations 557 allow for at least a portion of the exhaust gas first portion flowing towards the diffuser 550 to enter the diffuser 550 therethrough, which may further increase flow uniformity, adjust flow velocity and/or enhance mixing of the reductant with the exhaust gas first portion.

In particular embodiments, a first plenum sidewall of the first plenum 514 proximate to the first outlet 516 may include a first plenum sidewall curved portion 516a directing the exhaust gas first portion flow towards the first outlet 516. The first plenum sidewall curved portion 516a may create a smoother transition of two opposite swirls of the exhaust gas first portion flowing around the diffuser 550 towards the first outlet 516, eliminating recirculation and project the exhaust gas first portion flow towards the first outlet 516.

Figure 21:
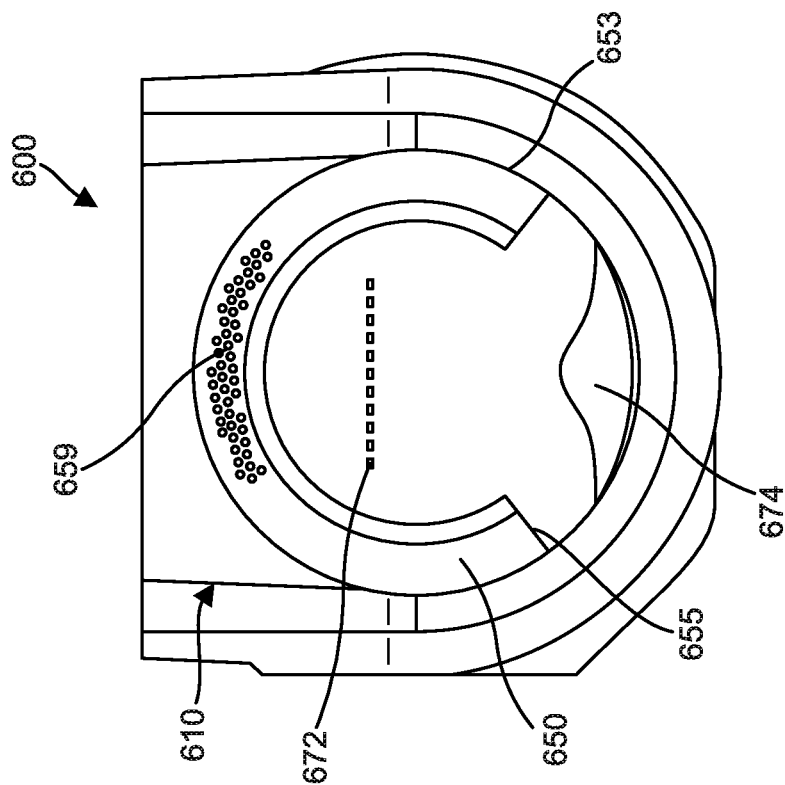
FIG. 21 is a rear cross-section view of a portion of the decomposition chamber of FIG. 20.
Figure 20:
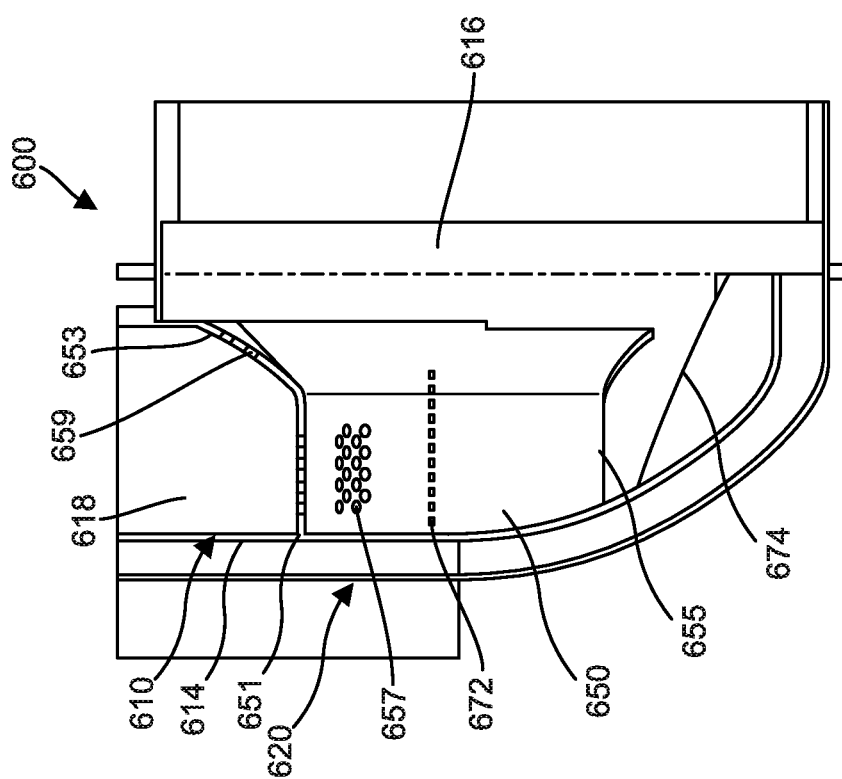
FIG. 20 is a side cross-section view of a portion of a decomposition chamber, according to yet another embodiment.

FIG. 20 shows a side cross section view, and FIG. 21 shows an enlarged view of a portion of a decomposition chamber 600 according to another embodiment. The decomposition chamber 600 comprises a first chamber 610 and a second chamber 620. The first chamber 610 comprises a first plenum 614 defining a first plenum internal volume 618, and a first outlet 616.

A diffuser 650 is positioned within the first plenum internal volume 618. The diffuser 650 comprises a diffuser first end 651 which defines a first cross-section. The diffuser first end 651 is positioned such that a gap exists between the first plenum sidewall of the first plenum 614 and the diffuser first end 651. In particular embodiments, the gap may be in a range of 1 mm to 5 mm (e.g., 1, 1.5, 2, 2.5, 3, 3.5, 4, 4.5 or 5 mm, inclusive of all ranges and values therebetween). A diffuser second end 653 is coupled to the first outlet 616 and defines a second cross-section larger than the first cross-section. The diffuser 650 defines a diffuser opening 655. A diffuser first portion of the diffuser 650 is cylindrical having a constant cross-section extending from the diffuser first end 651 towards the diffuser second end 653. A diffuser second portion of the diffuser 650 flares outwards at an angle from the diffuser first portion towards the first outlet 616.

A plurality of first perforations 657 are defined on the diffuser first portion, and may span less than half a circumference of the diffuser first portion. A plurality of second perforations 659 are also defined on the diffuser second portion. The plurality of second perforations 659, along with the plurality of first perforations 657 may further increase flow uniformity, adjust flow velocity and/or enhance mixing of the reductant with the exhaust gas first portion.

A diffuser baffle 672 is positioned within the diffuser 650 and extends from the first plenum sidewall towards the first outlet 616. As shown in FIG. 21, the diffuser baffle 672 is positioned horizontally within the diffuser 650. The diffuser baffle 672 has a width which is less than a diffuser width of the diffuser 650 and has a length less than a diffuser length of the diffuser 650. The diffuser baffle 672 may redirect a bypassed exhaust gas first portion flow from the diffuser 650 so as to increase uniformity of the exhaust gas first portion flow towards the first outlet 616. The diffuser baffle 672 may also include perforations, slots, louvers or have no openings defined therein. Moreover, while FIGS. 20-21 show the diffuser baffle 672 as being planar, in other embodiments, the diffuser baffle 672 may be concave, convex, curved and/or have any other suitable shape or size.

In particular embodiments, a first plenum curved plate 674 is positioned on a first plenum sidewall of the first plenum 614 proximate to the first outlet 616. The first plenum curved plate 674 is inclined at a downward angle from the first plenum sidewall towards the first outlet 616, and is structured to direct the exhaust gas first portion flow towards the first outlet 616. The first plenum curved plate 674 may create a smoother transition of two opposite swirls of the exhaust gas first portion flowing around the diffuser 650, by augmenting the natural flow profile of the two opposing swirl streams. A profile of the first plenum curved plate 674 may be structured to help sustain the swirl by separating the two swirl stream of the exhaust gas first portion, and facilitate projecting the exhaust gas first portion flow and reductant droplets towards the first outlet 616 so as to increase uniformity.

Figure 23:
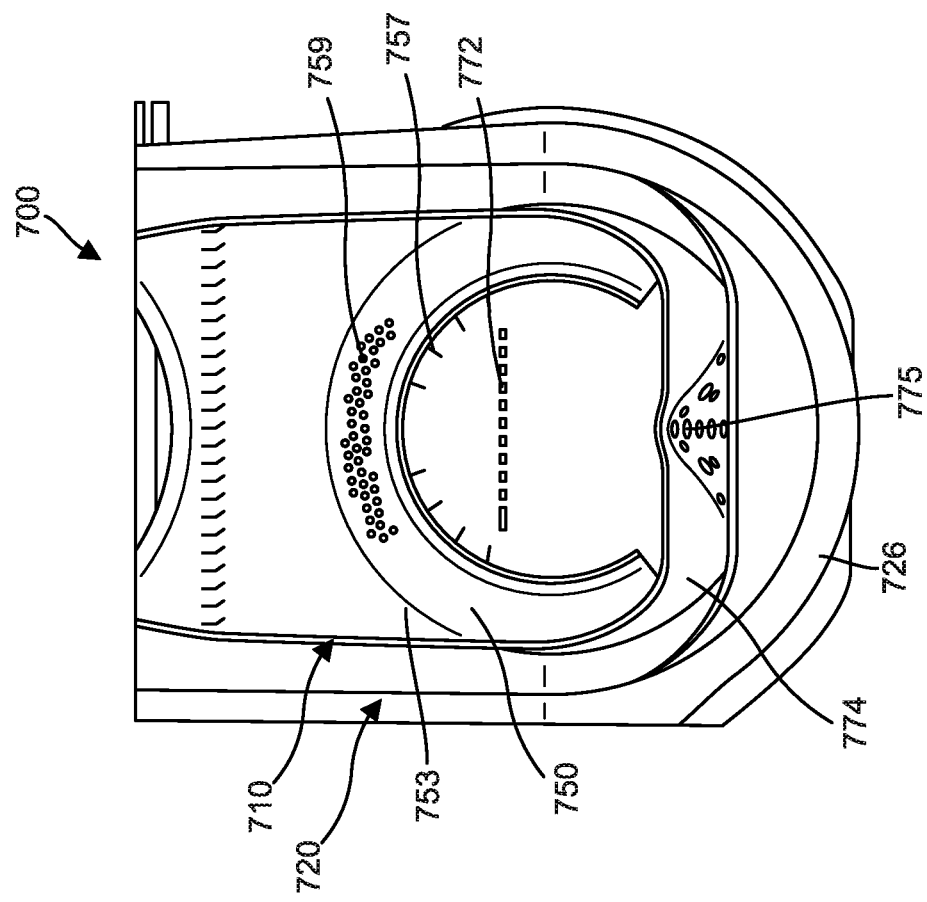
FIG. 23 is a rear cross-section view of a portion of the decomposition chamber of FIG. 22.
Figure 22:
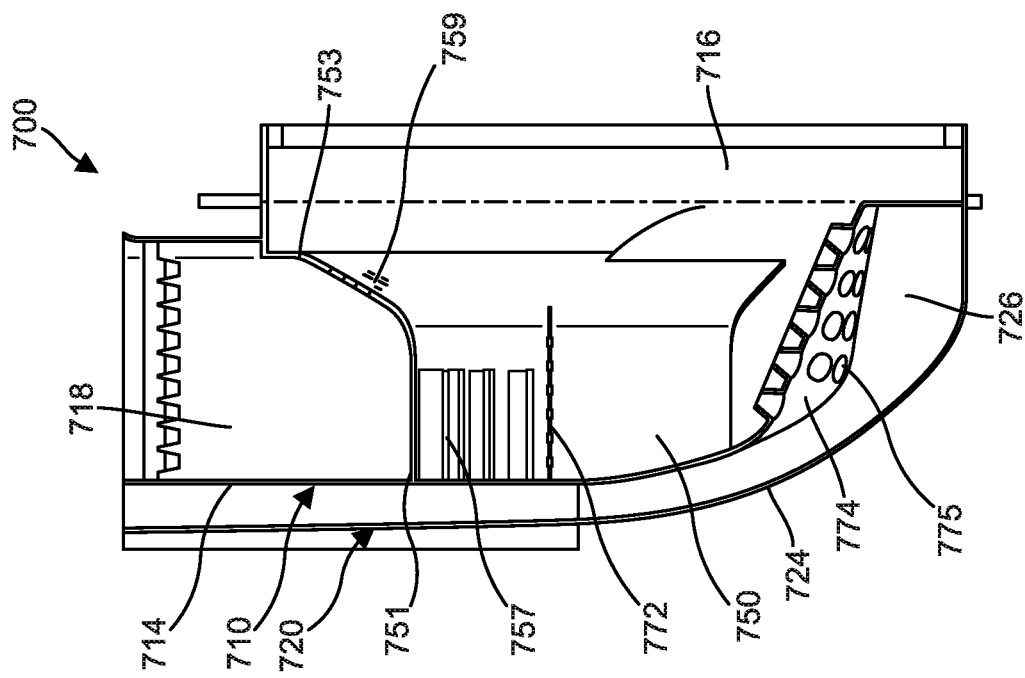
FIG. 22 is a side cross-section view of a portion of a decomposition chamber, according to still another embodiment.

FIG. 22 shows a side cross section view, and FIG. 23 shows an enlarged view of a portion of a decomposition chamber 700 according to yet another embodiment. The decomposition chamber 700 comprises a first chamber 710 and a second chamber 720. The first chamber 710 comprises a first plenum 714 defining a first plenum internal volume 718, and a first outlet 716. Furthermore, the second chamber 720 comprises a second plenum 724 having a second plenum second end 726 proximate to the first outlet 716.

A diffuser 750 is positioned within the first plenum internal volume 718 and comprises a diffuser first end 751 defining a first cross-section. The diffuser first end 751 is positioned such that a gap exists between the first plenum sidewall of the first plenum 714 and the diffuser first end 751. In particular embodiments, the gap may be in a range of 1 mm to 5 mm (e.g., 1, 1.5, 2, 2.5, 3, 3.5, 4, 4.5 or 5 mm, inclusive of all ranges and values therebetween). A diffuser second end 753 is coupled to the first outlet 716 and defines a second cross-section larger than the first cross-section. A diffuser first portion of the diffuser 750 is cylindrical having a constant cross-section extending from the diffuser first end 751 towards the diffuser second end 753. A diffuser second portion of the diffuser 750 flares outwards at an angle from the diffuser first portion towards the first outlet 716.

A plurality of longitudinal slots 757 are defined on the diffuser first portion, and extend axially from the diffuser first end 751 towards the diffuser second portion. A plurality of second perforations 759 are also defined on the diffuser second portion, as described previously with respect to the diffuser 750. A diffuser baffle 772 is positioned within the diffuser 750, and may be substantially similar in structure and function to the diffuser baffle 772.

A first plenum curved plate 774 is positioned on a first plenum sidewall of the first plenum 714 proximate to second plenum second end 726. The first plenum curved plate 774 is inclined at a downward angle from the first plenum sidewall towards the first outlet 716. The first plenum curved plate 774 defines a plurality of apertures 775 fluidly coupling the second plenum 724 to the first plenum 714 at the second plenum second end 726. At least a portion of the exhaust gas second portion may enter the first plenum internal volume 718 through the plurality of apertures 775 such that the first plenum curved plate 774, in addition to directing the exhaust gas flow towards the first outlet 716, may also increase shear on the first plenum sidewall via the portion of the exhaust gas second portion, and propel the reductant droplets towards the first outlet 716.

Figure 25:
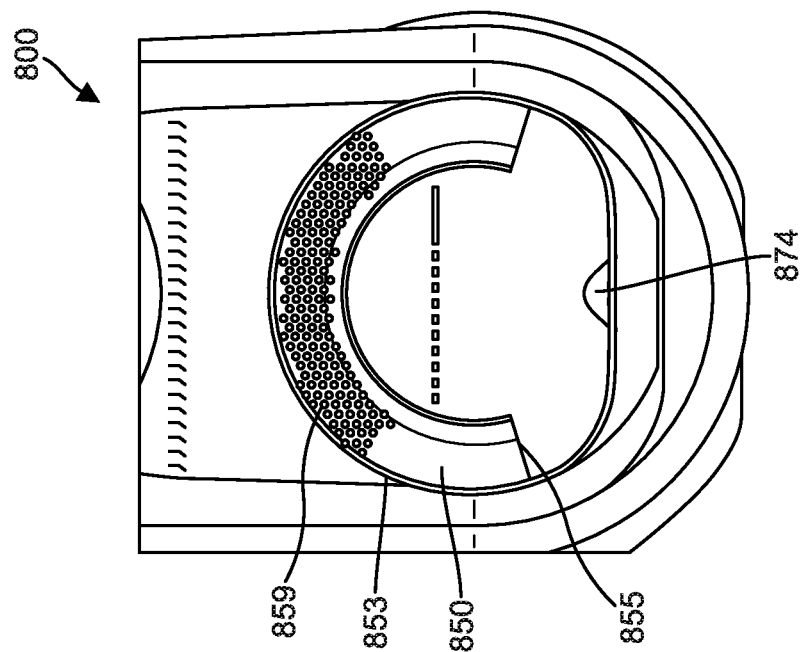
FIG. 25 is a side cross-section view of a portion of the decomposition chamber of FIG. 24.
Figure 24:
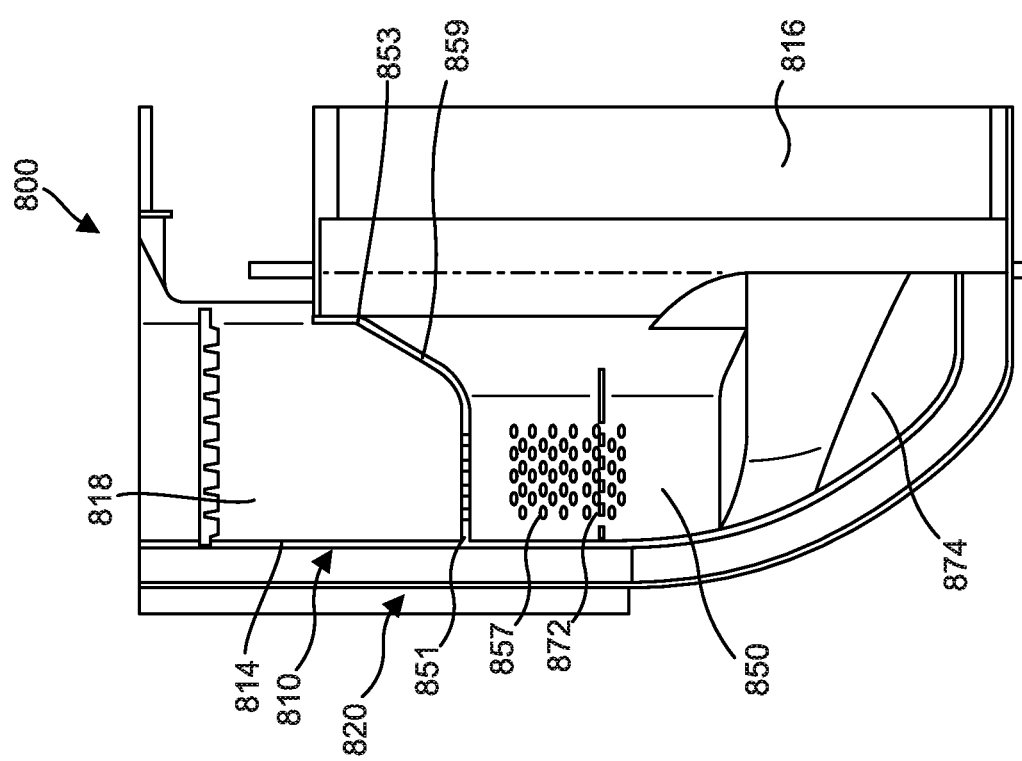
FIG. 24 is a side cross-section view of a portion of a decomposition chamber, according to a particular embodiment.

FIG. 24 shows a side cross section view, and FIG. 25 shows an enlarged view of a portion of a decomposition chamber 800 according to another embodiment. The decomposition chamber 800 comprises a first chamber 810 and a second chamber 820. The first chamber 810 comprises a first plenum 814 defining a first plenum internal volume 818, and a first outlet 816.

A diffuser 850 is positioned within the first plenum internal volume 818. The diffuser 850 comprises a diffuser first end 851 which defines a first cross-section. The diffuser first end 851 is positioned such that a gap exists between the first plenum sidewall of the first plenum 814 and the diffuser first end 851. In particular embodiments, the gap may be in a range of 1 mm to 5 mm (e.g., 1, 1.5, 2, 2.5, 3, 3.5, 4, 4.5 or 5 mm, inclusive of all ranges and values therebetween). A diffuser second end 853 is coupled to the first outlet 816 and defines a second cross-section larger than the first cross-section. The diffuser 850 comprises a diffuser first portion and a diffuser second portion as described previously with respect to the diffuser 650, 750, and defines a diffuser opening 855 which is larger than the diffuser opening 655 of the diffuser 650.

Furthermore, a plurality of first perforations 857 are defined on the diffuser first portion. The plurality of first perforations 857 have a larger diameter and more densely distributed than the plurality of first perforations 557, 657 of the diffuser 550, 650. Moreover, the plurality of first perforations 857 span more than half of a circumference of the diffuser first portion.

A plurality of second perforations 859 are also defined on the diffuser second portion. The plurality of second perforations 859 have a larger diameter and are more densely distributed than the plurality of second perforations 859 of the diffuser 850. A diffuser baffle 872 is positioned within the diffuser 850 and extends from a first plenum sidewall of the first plenum 814 towards the first outlet 816. Moreover, a first plenum curved plate 874 is positioned on a first plenum sidewall of the first plenum 814, and is inclined at downward angle from the first plenum sidewall towards the first outlet 816.

Figure 27:
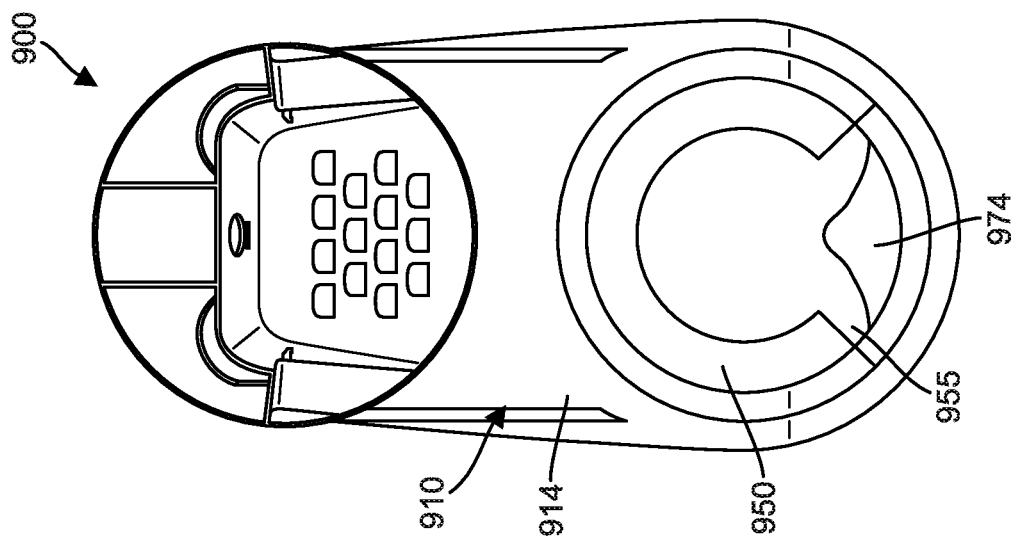
FIG. 27 is a side cross-section of the decomposition chamber of FIG. 26.
Figure 26:
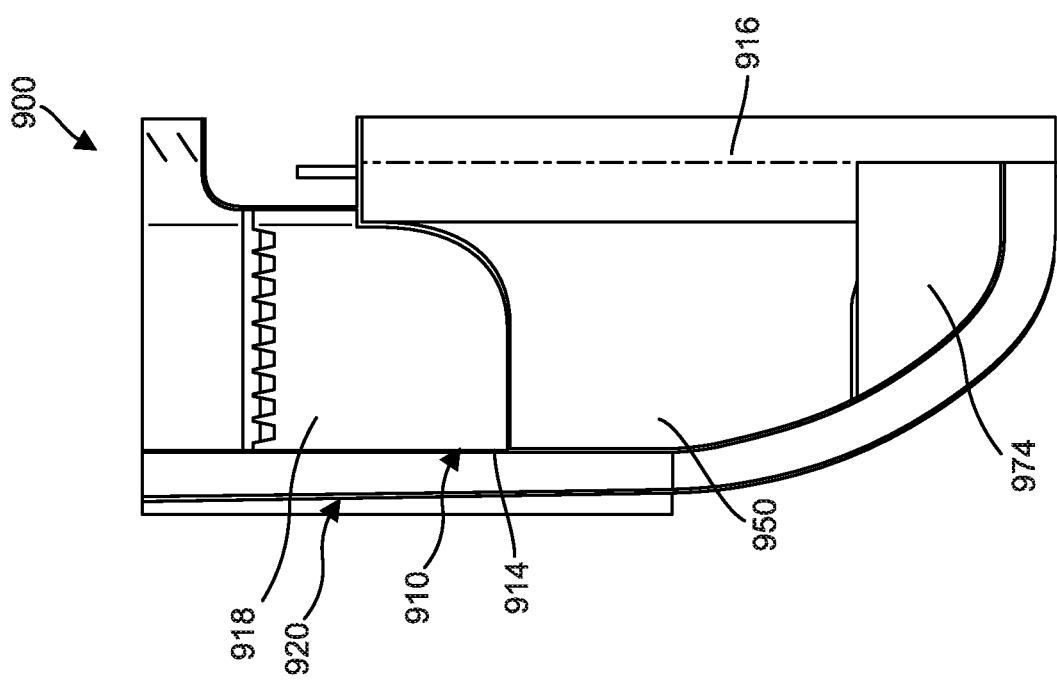
FIG. 26 is a side cross-section view of a portion of a decomposition chamber, according to yet another embodiment.

FIG. 26 shows a side cross section view, and FIG. 27 shows an enlarged view of a portion of a decomposition chamber 900, according to still another embodiment. The decomposition chamber 900 comprises a first chamber 910 and a second chamber 920. The first chamber 910 comprises a first plenum 914 defining a first plenum internal volume 918, and a first outlet 916. A diffuser 950 is positioned within the first plenum internal volume 918 and defines a diffuser opening 955 which is smaller than the diffuser openings 655 and 855 of the diffusers 650 and 850, respectively. A first plenum curved plate 974 is positioned on a first plenum sidewall of the first plenum 914. The first plenum curved plate 974 is axially aligned with the first outlet 916, and extends from a first plenum sidewall of the first plenum 914 towards the first outlet 916.

Figure 29:
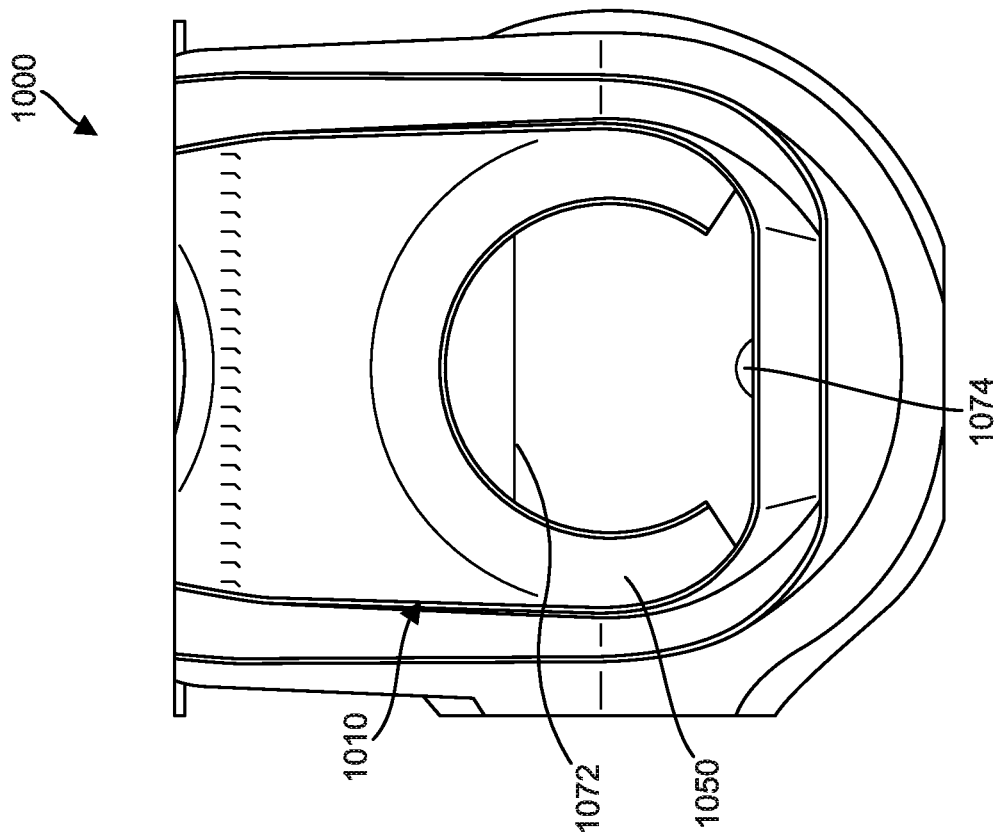
FIG. 29 is a rear cross-section view of a portion of the decomposition chamber of FIG. 28.
Figure 28:
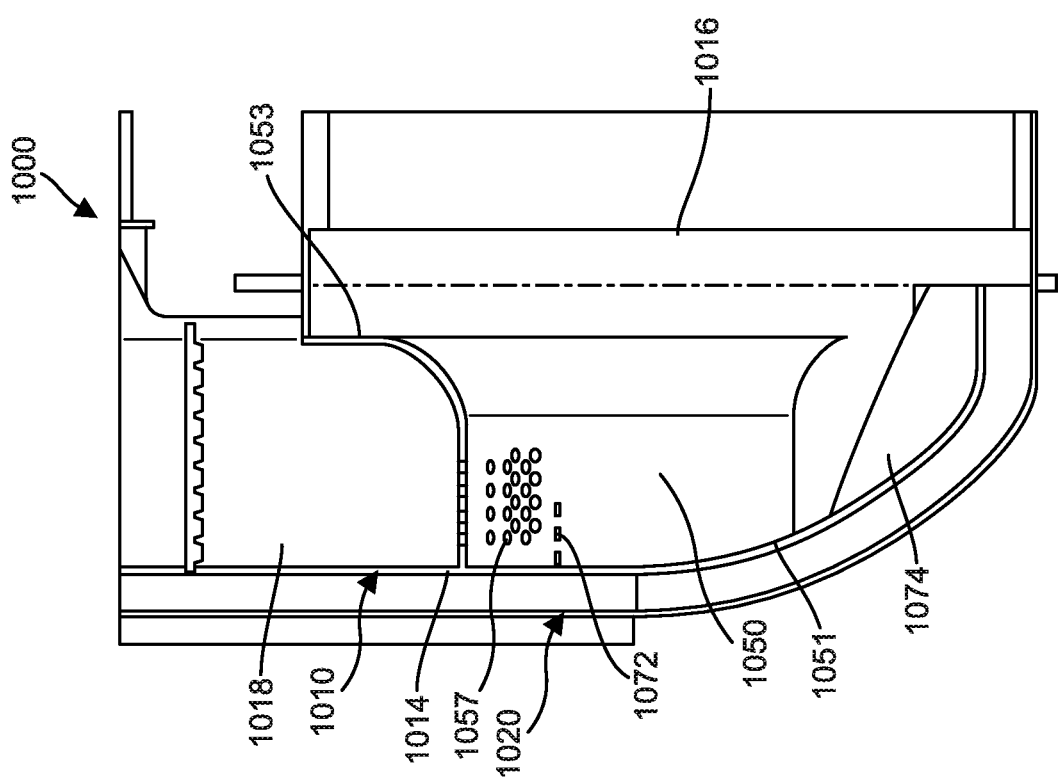
FIG. 28 is a side cross-section view of a portion of a decomposition chamber, according to still another embodiment.
Figure 30:
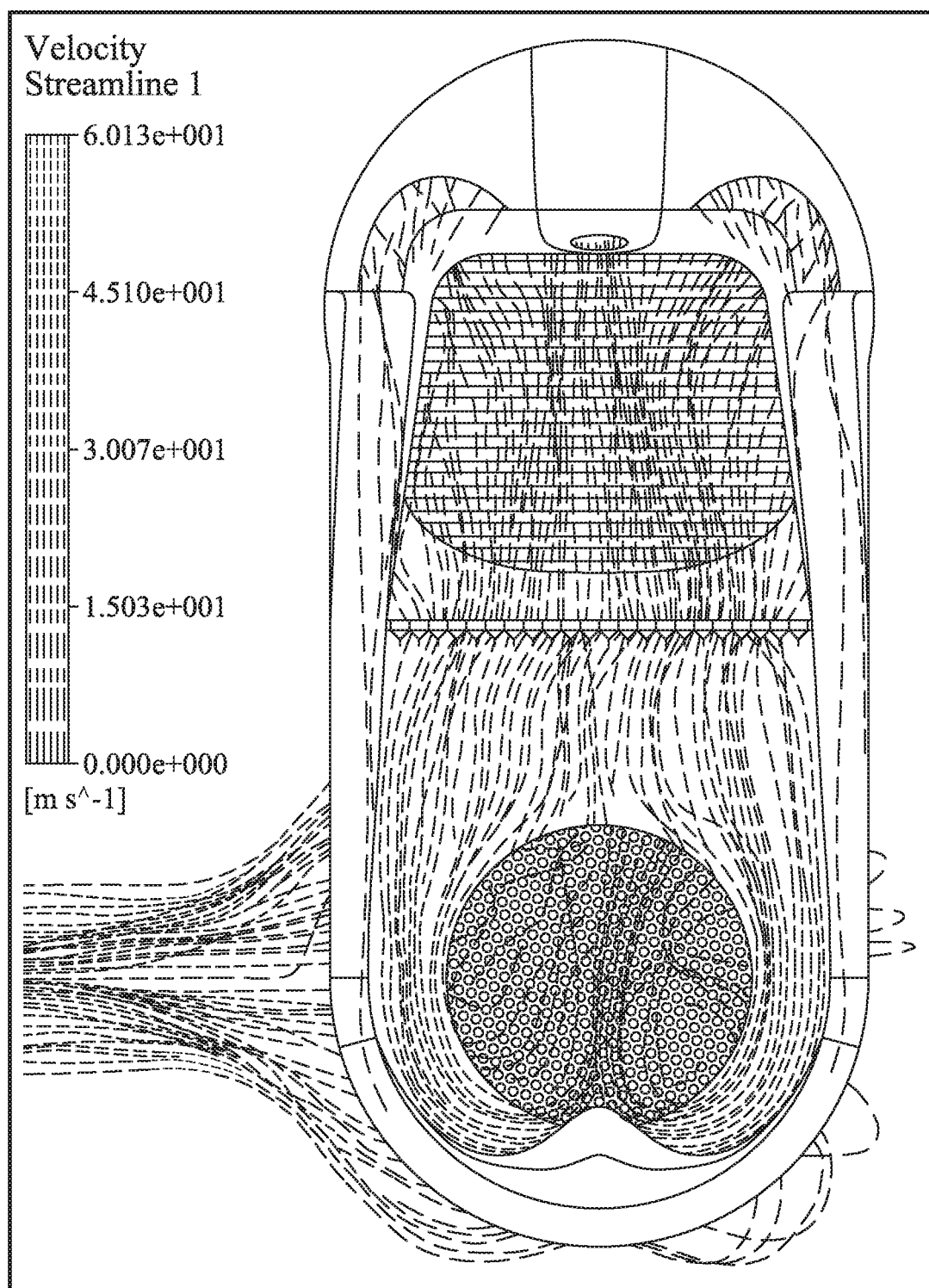
FIGS. 30-33 are computational fluid dynamic (CFD) simulations showing thermal gradients of exhaust gas flowing through the decomposition chamber of FIG. 1.
Figure 31:
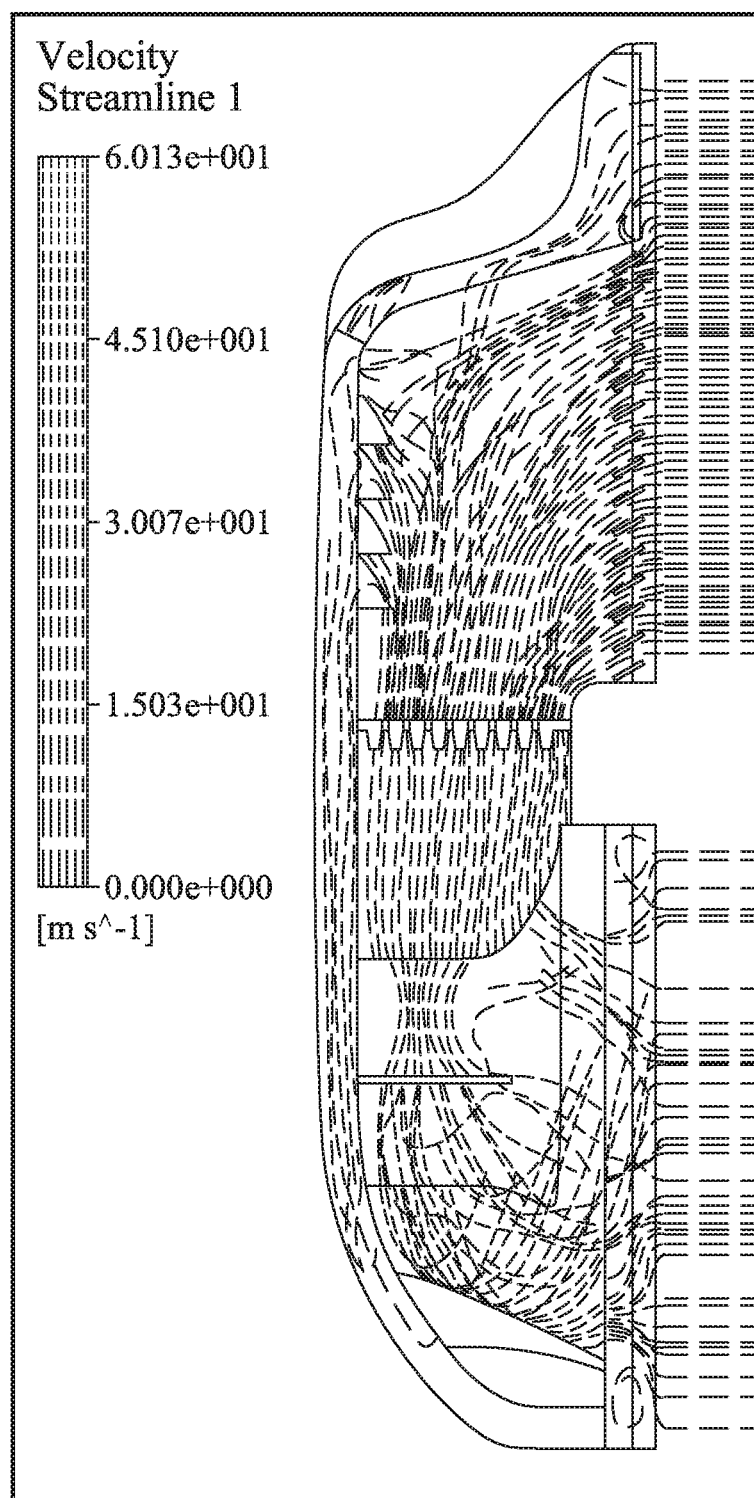
Figure 32:
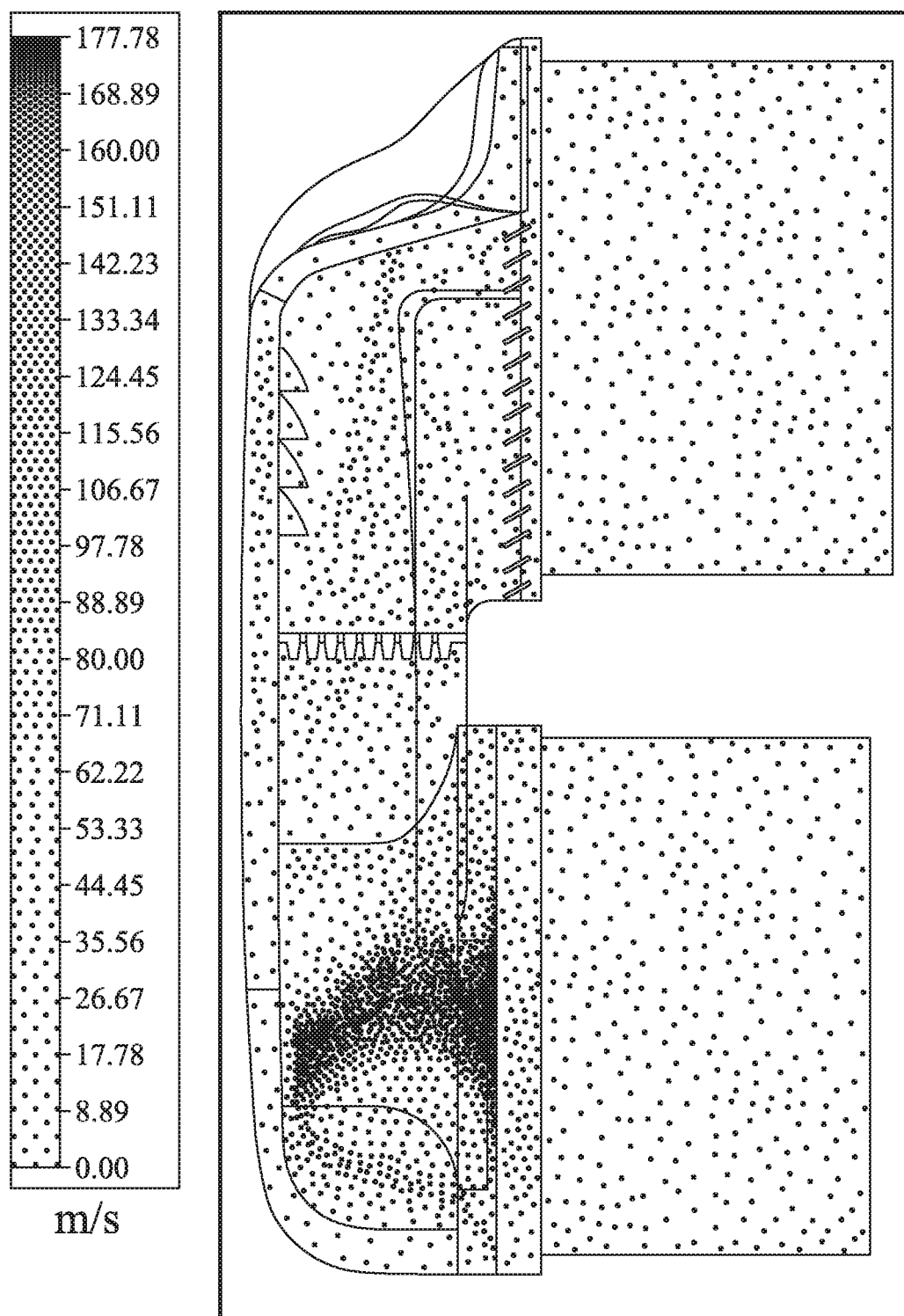
Figure 33:
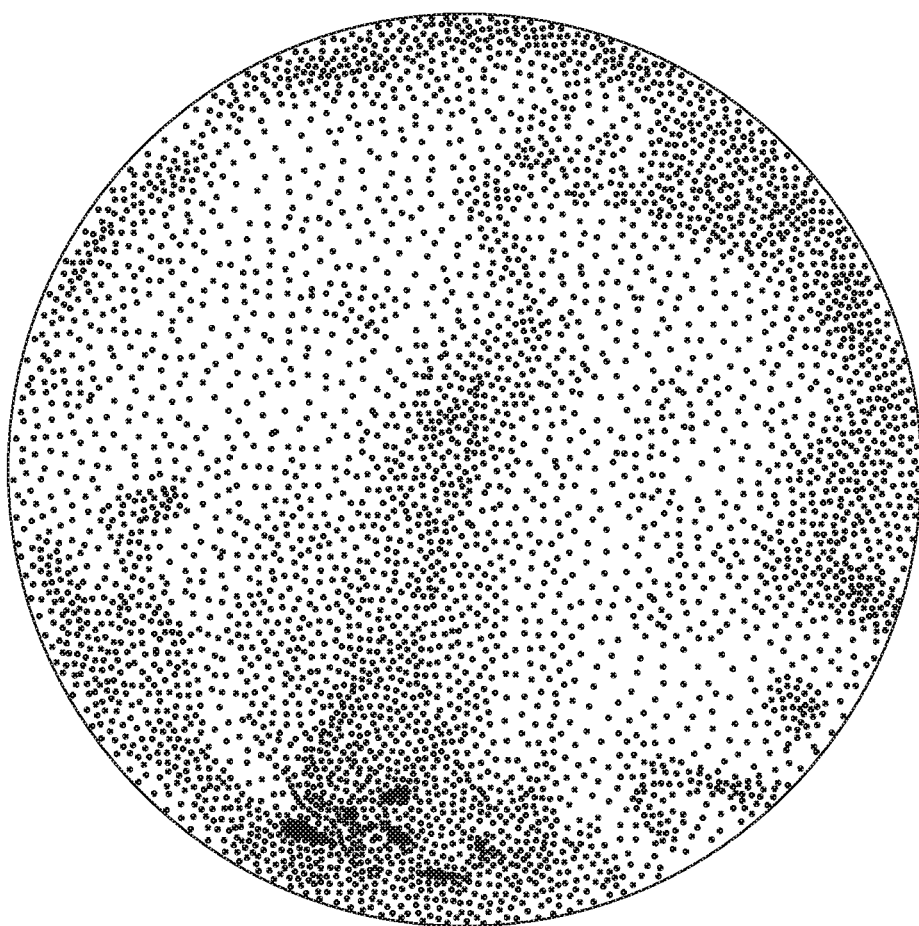
Figure 37:
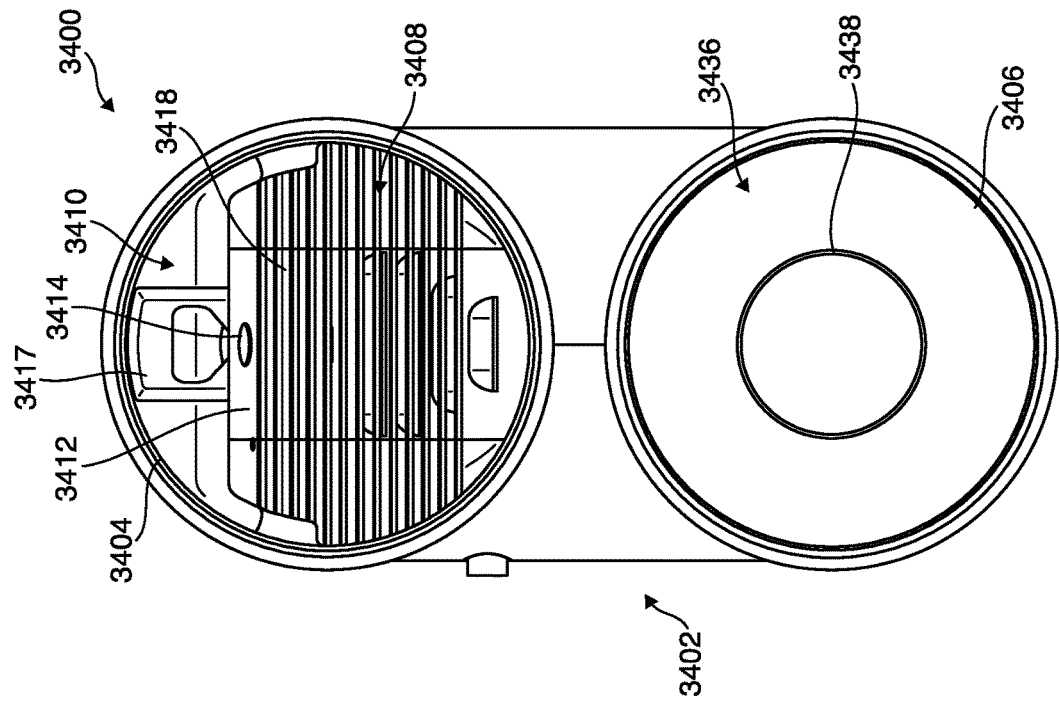
FIG. 37 is a front view of the decomposition chamber of FIG. 36.
Figure 36:
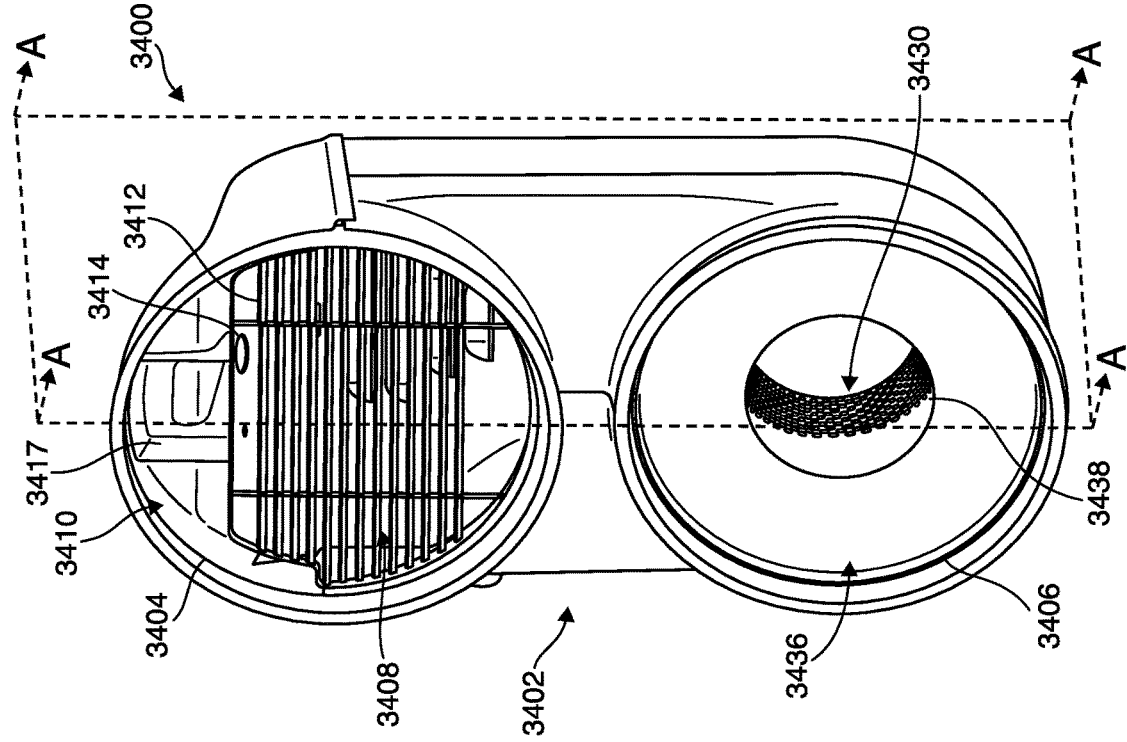
FIG. 36 is a perspective view of a decomposition chamber, according to yet another embodiment.

FIG. 28 shows a side cross section view, and FIG. 29 shows an enlarged view of a portion of a decomposition chamber 1000, according to another embodiment. The decomposition chamber 1000 comprises a first chamber 1010 and a second chamber 1020. The first chamber 1010 comprises a first plenum 1014 defining a first plenum internal volume 1018, and a first outlet 1016.

A diffuser 1050 is positioned within the first plenum internal volume 1018. The diffuser 1050 comprises a diffuser first end 1051 coupled to a first plenum sidewall and a diffuser second end 1053 which is coupled to the first outlet 1016. The diffuser 1050 comprises a diffuser first portion and a diffuser second portion as described previously with respect to the diffuser 650, 750. A plurality of first perforations 1057 are defined on the diffuser first portion.

A diffuser baffle 1072 is positioned within the diffuser 1050 and extends from a first plenum sidewall of the first plenum 1014 towards the first outlet 1016. The diffuser baffle 1072 has a diffuser baffle length less than half a diffuser first portion length of the diffuser first portion. Furthermore, the diffuser baffle 1072 has a width which is about a width of a segment of the diffuser baffle first portion within which the diffuser baffle 1072 is positioned. A first plenum curved plate 1074 is positioned on a first plenum sidewall of the first plenum 1014, and is inclined at downward angle from the first plenum sidewall towards the first outlet 1016.

FIGS. 30-33 are CFD simulations showing velocity profiles of the exhaust gas first portion, the exhaust gas second portion and the exhaust gas third portion through the decomposition chamber 100. As apparent from simulations, the decomposition chamber 100 is structured such that the exhaust gas first portion accelerates in the first plenum and has a maximum exhaust gas first portion velocity at the first outlet, and has a high flow distribution index (FDI) at the first outlet as highlighted in FIG. 33.

FIGS. 34 and 35 show a cross-sectional view of a decomposition chamber 3400, according to an embodiment. The decomposition chamber 3400 includes a body 3402. The body 3402 includes an inlet 3404 and an outlet 3406. The inlet 3404 is configured to receive (e.g., structured to receive, etc.) exhaust gas from an engine (e.g., diesel internal combustion engine, a gasoline internal combustion engine, a biodiesel internal combustion engine, a natural gas internal combustion engine, a dual-fuel internal combustion engine, etc.). The outlet 3406 is configured to provide exhaust gas (e.g., exhaust gas treated with reductant, etc.) to a downstream exhaust component (e.g., SCR system, aftertreatment component, muffler, tailpipe, etc.).

The body 3402 also defines a main flow chamber 3408 and a thermal management chamber 3410. The main flow chamber 3408 receives an exhaust gas first portion from the inlet 3404 and the thermal management chamber 3410 receives an exhaust gas second portion from the inlet 3404. The body 3402 can be variously configured to provide a target ratio between the exhaust gas first portion and the exhaust gas second portion (e.g., 70%/30%, 80%/20%, 90%, 10%, etc.) such that the decomposition chamber 3400 is tailored for a target application.

The main flow chamber 3408 is configured to at least partially separate the first portion from the second portion and the thermal management chamber 3410 is configured to at least partially separate the second portion from the first portion. The main flow chamber 3408 includes a main flow chamber inlet wall 3412. In various embodiments, the main flow chamber inlet wall 3412 is substantially disposed along a plane (e.g., a lateral plane, etc.).

The main flow chamber inlet wall 3412 includes an exhaust assist aperture 3414. The exhaust assist aperture 3414 is configured to receive reductant (e.g., urea, DEF, etc.) from a doser mounted to a doser mount 3416 of the body 3402. The body 3402 also defines an exhaust assist chamber 3417. The exhaust assist chamber 3417 is positioned outside of the main flow chamber 3408 and protrudes into the thermal management chamber 3410. The exhaust assist chamber 3417 receives an exhaust gas third portion from the inlet 3404, separate from the exhaust gas first portion received by the main flow chamber 3408 and the exhaust gas second portion received by the thermal management chamber 3410. The exhaust assist aperture 3414 is disposed underneath the exhaust assist chamber 3417 such that the exhaust gas third portion from the exhaust assist chamber 3417 may flow into the main flow chamber 3408 via the exhaust assist aperture 3414.

The exhaust assist chamber 3417 is disposed underneath the doser mount 3416 and is configured to receive reductant from a doser coupled to the doser mount. For example, a doser may be coupled to the doser mount 3416 and configured to selectively inject reductant through the doser mount 3416 into the exhaust assist chamber 3417 where the reductant mixes with the exhaust gas third portion that flowed into the exhaust assist chamber 3417 and further flow into the main flow chamber 3408 where the exhaust gas third portion mixes with the exhaust gas first portion. The thermal management chamber receives the exhaust gas second portion from the inlet 3404 and routes the exhaust gas second portion around the exhaust assist chamber 3417.

The main flow chamber 3408 also includes a dividing wall 3418. The dividing wall 3418 extends within the body 3402 and is contiguous with the main flow chamber inlet wall 3412. The main flow chamber 3408 also includes a main flow chamber first sidewall 3420 and a main flow chamber second sidewall 3422. The main flow chamber first sidewall 3420 and the main flow chamber second sidewall 3422 are contiguous with the dividing wall 3418.

The main flow chamber first sidewall 3420 includes a first convex portion 3424 extending towards the main flow chamber second sidewall 3422. Similarly, the main flow chamber second sidewall 3422 includes a second convex portion 3426 extending towards the main flow chamber first sidewall 3420. The first convex portion 3424 is aligned with the second convex portion 3426 and the first convex portion 3424 and the second convex portion 3426 are centered proximate a middle portion (e.g., between the inlet 3404 and the outlet 3406, etc.) of the main flow chamber first sidewall 3420 and/or the main flow chamber second sidewall 3422. The first convex portion 3424 and the second convex portion 3426 may be substantially identical (e.g., defined by the same dimensions, etc.).

The first convex portion 3424 and the second convex portion 3426 are opposed to each other so as to form a constricted region (e.g., a constriction, etc.) in the main flow chamber 3408. The main flow chamber 3408 collects exhaust gas (e.g., the exhaust gas first portion from the inlet 3404, the exhaust gas third portion from the exhaust assist aperture 3414, etc.) and forces the exhaust gas through the constriction formed between the first convex portion 3424 and the second convex portion 3426. This constriction creates an area of relatively high velocity which facilitates increased mixing (e.g., diffusion, etc.) of the reductant within the exhaust gases, thereby enabling exhaust gases provided from the outlet 3406 to have a relatively high uniformity index (UI) and to have a relatively low amount of NOx while also mitigating deposit formation and/or growth of deposits within the main flow chamber 3408.

In some embodiments, the main flow chamber 3408 also includes a mixer 3428. The mixer 3428 is coupled to the first convex portion 3424 and the second convex portion 3426 proximate the midpoint of each of the first convex portion 3424 and the second convex portion 3426. In this way, the first convex portion 3424 and the second convex portion 3426 function to increase the speed of the exhaust gases as the exhaust gases flow towards and through the mixer 3428. The mixer 3428 functions to further mix the exhaust gases and the reductant. The mixer 3428 may include a plurality of slots, perforations, vanes, and/or swirl devices configured to induce mixing of the exhaust gases and the reductant (e.g., by inducing a swirl flow, etc.).

The main flow chamber 3408 also includes a diffuser 3430. The diffuser 3430 is configured to receive the exhaust gases from the mixer 3428 and provide the exhaust gases to the outlet 3406. The diffuser 3430 is configured such that no exhaust gases can circumvent the diffuser 3430. As a result, all the exhaust gases provided from the outlet 3406 first pass through the diffuser 3430.

The diffuser 3430 includes a diffuser inlet portion 3431. The diffuser inlet portion 3431 is cylindrical and is coupled to the dividing wall 3418 such that the diffuser inlet portion 3431 extends within the main flow chamber 3408. The main flow chamber 3408 extends in three-hundred and sixty degrees around the diffuser inlet portion 3431 such that the exhaust gases can completely surround the diffuser inlet portion 3431.

The diffuser inlet portion 3431 includes a cylindrical wall in which a plurality of diffuser perforations 3432 are formed. The diffuser perforations 3432 facilitate consistent mixing of the exhaust gases and reductant, and therefore consistent dispersion of the reductant within the exhaust gases. The diffuser perforations 3432 may be identical to one another and are arranged about the diffuser 3430. The diffuser perforations 3432 are arranged in a plurality of rows extending three-hundred and sixty degrees about the diffuser 3430. The diffuser 3430 includes a large number of the diffuser perforations 3432 such that the diffuser perforations 3432 are disposed on a substantial portion (e.g., 80%, 90%, etc.) of the portion of diffuser inlet portion 3431. In this way, the diffuser perforations 3432 provide a relatively large open area for the exhaust gases to flow through, thereby minimizing back pressure of the exhaust gases upstream of the diffuser 3430. The relatively large open area for the exhaust gases to flow through mitigates deposit formation within the main flow chamber 3408, such as on the upstream surfaces of the diffuser 3430. The resulting minimized backpressure facilitates attainment of a relatively high fuel economy (e.g., efficiency, etc.) for an internal combustion engine having the decomposition chamber 3400 compared to an internal combustion engine without the decomposition chamber 3400.

The diffuser perforations 3432 provide the exhaust gases into the diffuser inlet portion 3431 and subsequently into a mixing chamber 3434 upstream of the outlet 3406. The mixing chamber 3434 extends between the diffuser 3430 and an annular plate 3436. The annular plate 3436 includes an annular plate aperture 3438 through which the exhaust gases are provided from the mixing chamber 3434 to the outlet 3406. In various embodiments, the annular plate aperture 3438 is centered on the outlet 3406 (e.g., a central axis of the annular plate aperture 3438 is coincident with a central axis of the outlet 3406, etc.) and centered on the diffuser 3430 (e.g., a center axis of the annular plate aperture is coincident with a central axis of the diffuser 3430, etc.).

The diffuser 3430 includes a diffuser flange portion 3440. The diffuser flange portion 3440 is configured to receive the exhaust gas from the diffuser inlet portion 3431 and provide the exhaust gas to the outlet 3406. The diffuser flange portion 3440 prevents the exhaust gas from circumventing the diffuser 3430 as the exhaust gas travels towards the outlet 3406. As a result, the exhaust gas can reach the outlet 3406 via the diffuser perforations 3432, and preferably only via the diffuser perforations 3432.

The diffuser inlet portion 3431 is defined by a diameter $d_1$. Similarly, the annular plate aperture 3438 is defined by a diameter $d_2$. The diameter $d_2$ of the annular plate aperture 3438 may be less than (e.g., 97% of, 95% of, 90% of, etc.) the diameter $d_1$ of the diffuser inlet portion 3431. The diffuser flange portion 3440 is defined by a diameter $d_3$. The difference in the diameter $d_1$ of the diffuser inlet portion 3431 and the diameter $d_3$ of the diffuser flange portion 3440 causes at least some of the exhaust gas flowing from the diffuser 3430 (e.g., downstream of the diffuser perforations 3432, etc.) to flow into portions of the mixing chamber 3434 that are between the diffuser flange portion 3440 and the annular plate 3436. After flowing into the portions of the mixing chamber 3434 that are between the diffuser flange portion 3440 and the annular plate 3436, the exhaust gases are recirculated and flow out of the annular plate aperture 3438. This recirculation causes additional mixing of the exhaust gases and the reductant prior to the exhaust gases being provided from the outlet 3406. A distance L between the diffuser flange portion 3440 and the annular plate 3436 and the diameter $d_3$ of the diffuser flange portion 3440 and therefore a volume of the mixing chamber 3434, may be selected such that a target amount of recirculation occurs and such that the decomposition chamber 3400 is tailored for a target application.

The thermal management chamber 3410 includes a flow guide 3442. The flow guide 3442 is coupled to the dividing wall 3418, protrudes into the thermal management chamber 3410, and is coupled to a thermal management chamber back wall 3443. The flow guide 3442 is configured to guide (e.g., route, direct, etc.) the exhaust gas second portion within the thermal management chamber 3410 from the inlet 3404 along the dividing wall 3418 such that the dividing wall 3418 is substantially uniformly heated by the exhaust gas second portion within the thermal management chamber 3410. For example, the flow guide 3442 may be arc-shaped (e.g., U-shaped, horseshoe shaped, arcuate, etc.) such that the exhaust gas second portion is routed in a clockwise direction around one end of the flow guide 3442 and counter-clockwise direction around another end of the flow guide 442 within the thermal management chamber 3410.

The flow guide 3442 also directs the exhaust gas second portion in the thermal management chamber 3410 to a plurality of louvers 3444 (e.g., vents, slats, etc.) in the dividing wall 3418. Each of the plurality of louvers 3444 facilitates flow of the exhaust from the thermal management chamber 3410 into the main flow chamber 3408. In this way, the exhaust gases provided into the mixer 3428 are (i) the exhaust gas first portion which enters the main flow chamber 3408 through the inlet 3404 directly, (ii) the exhaust gas second portion which enters the main flow chamber 3408 through the plurality of louvers 3444, and (iii) the exhaust gas third portion which enters the main flow chamber 3408 through the exhaust assist aperture 3414. The exhaust gas second portion from the thermal management chamber 3410 is dosed with reductant within the main flow chamber 3408 (e.g., downstream of the louvers 3444, etc.). Accordingly, the thermal management chamber 3410 functions to provide heating of the dividing wall 3418 using exhaust gas, the exhaust gas second portion, which has not yet been dosed with reductant, thereby preventing reductant deposit formation within the thermal management chamber 3410, and to subsequently provide these exhaust gases into the main flow chamber 3408 for dosing with reductant and/or mixing with other exhaust gases which have already been dosed with reductant.

Figure 39:
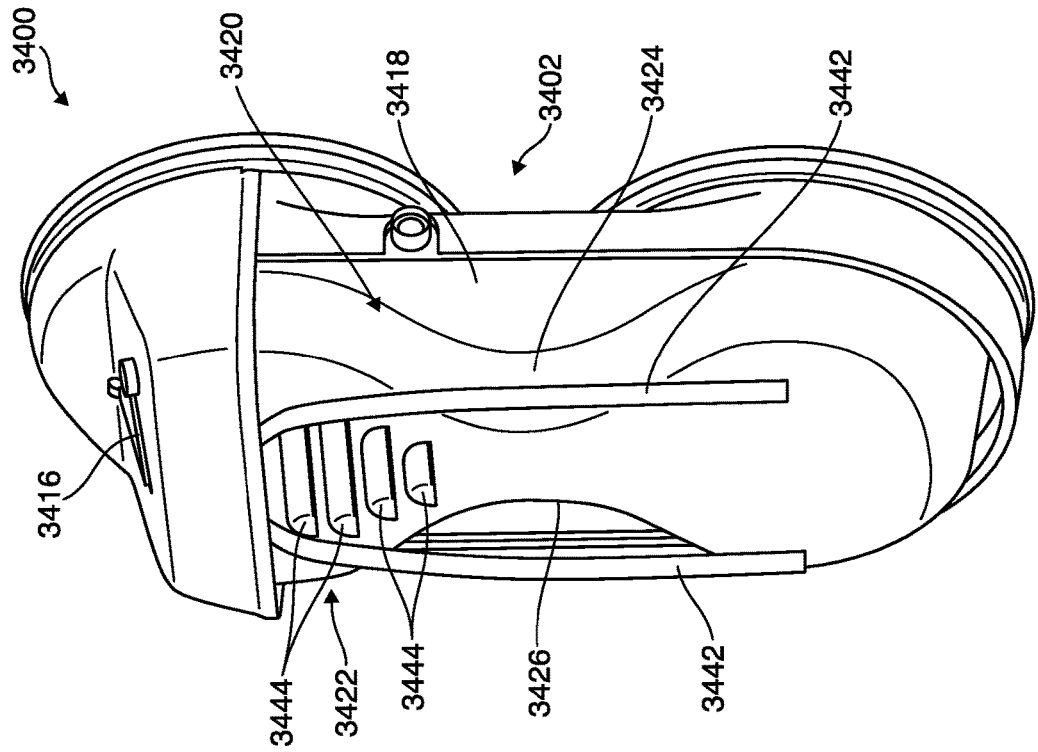
FIG. 39 is a rear cross-section view of the decomposition chamber of FIG. 36.
Figure 38:
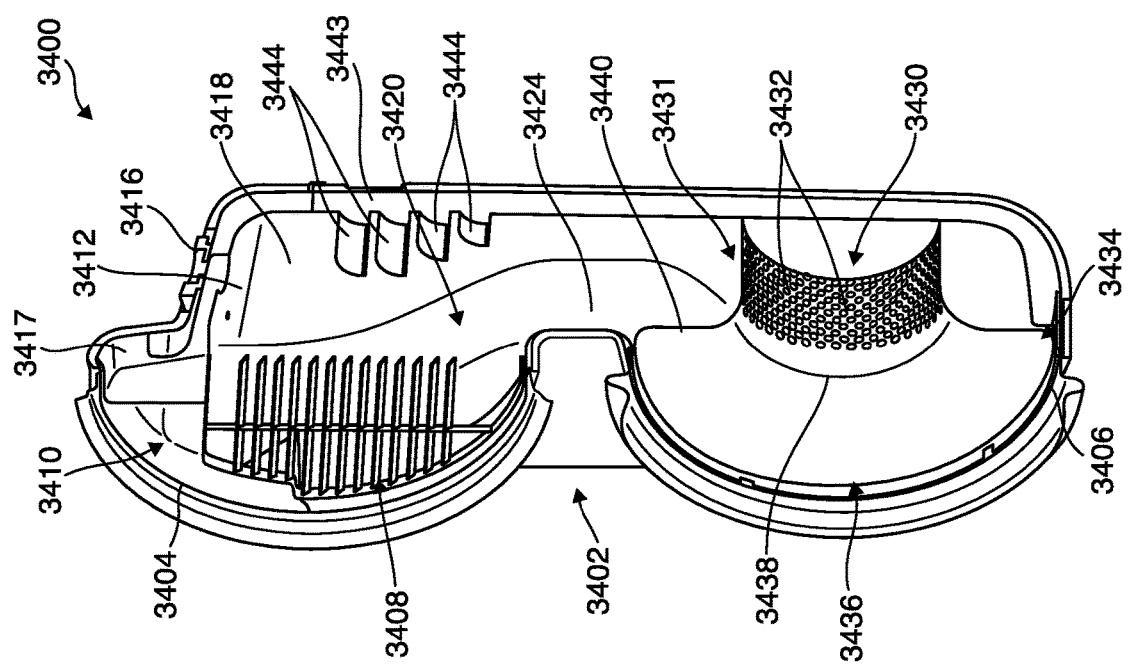
FIG. 38 is a front cross-section view of the decomposition chamber of FIG. 36.

FIGS. 36-39 show the decomposition chamber 3400 without the mixer 3428. FIG. 38 is a cross-sectional view of FIG. 36 taken about plane A-A. FIG. 39 is a rear view of the decomposition chamber 3400 shown in FIG. 36 without the thermal management chamber back wall 3443 shown.

Figure 41:
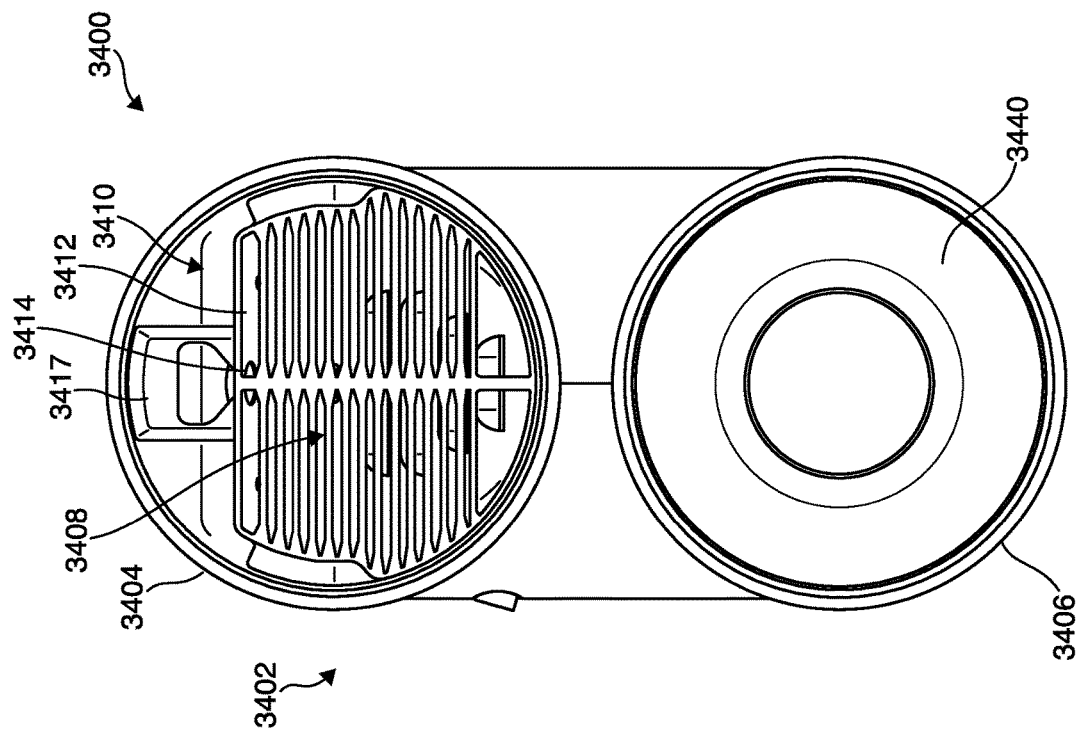
FIG. 41 is a front view of the decomposition chamber of FIG. 40.
Figure 40:
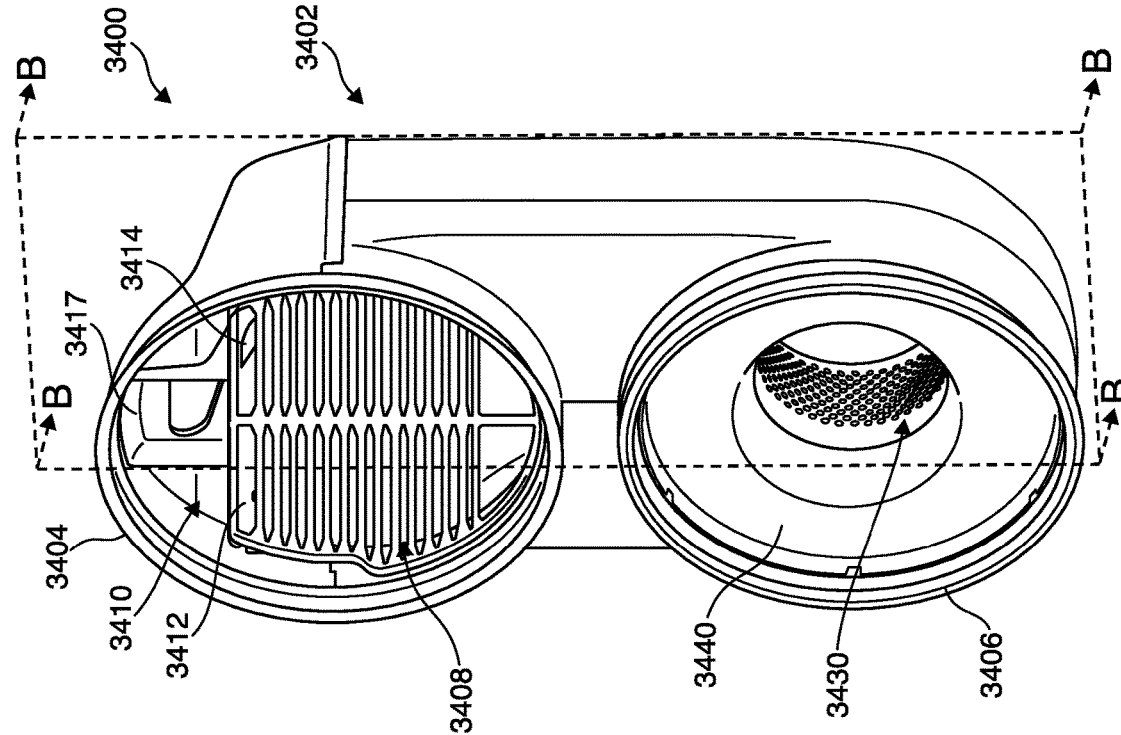
FIG. 40 is a perspective view of a decomposition chamber, according to yet another embodiment.
Figure 42:
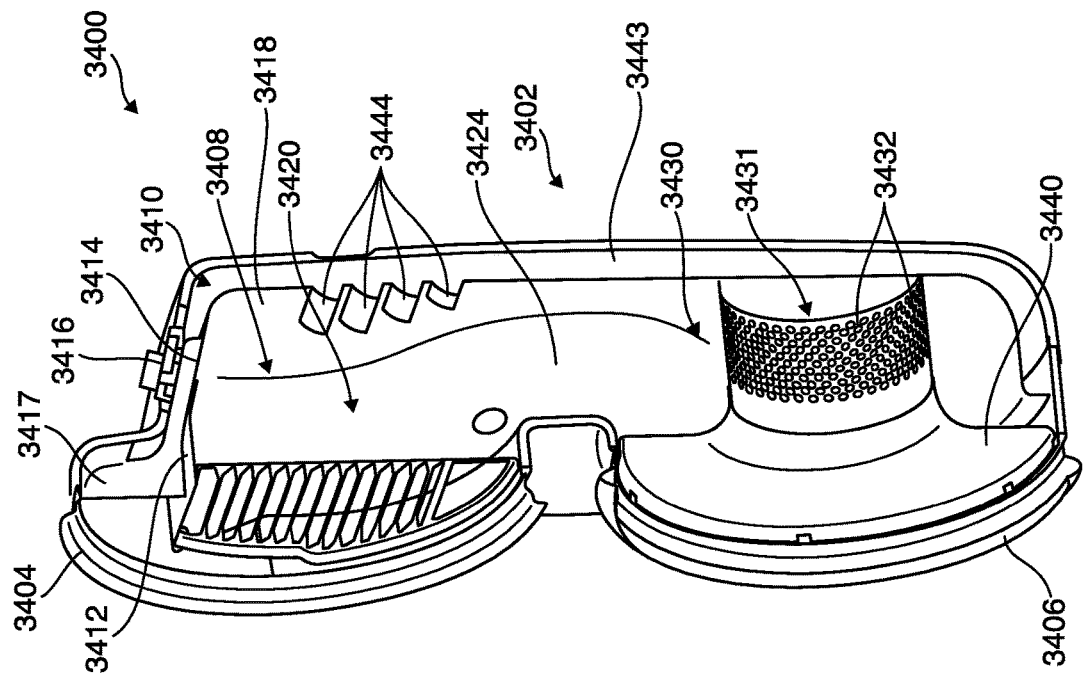
FIG. 42 is a front cross-section view of the decomposition chamber of FIG. 40.

FIGS. 40-42 show the decomposition chamber 3400 without the mixer 3428 and without the annular plate 3436. FIG. 42 is a cross-sectional view of FIG. 40 taken about plane A-A.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A decomposition chamber for an aftertreatment system, the decomposition chamber comprising:
   a body comprising:
      an inlet configured to receive exhaust gas,
      an outlet configured to expel the exhaust gas, a thermal management chamber in fluid communication with the inlet, the thermal management chamber configured to receive a first portion of the exhaust gas from the inlet, an exhaust assist chamber in fluid communication with the inlet, the exhaust assist chamber configured to receive a second portion of the exhaust gas from the inlet, and a main flow chamber in fluid communication with the inlet, the main flow chamber configured to receive a third portion of the exhaust gas from the inlet, receive the first portion of the exhaust gas from the thermal management chamber, and receive the second portion of the exhaust gas from the exhaust assist chamber.

2. The decomposition chamber of claim 1, further comprising:

a flow guide projecting into the thermal management chamber;

wherein the main flow chamber comprises a dividing wall that separates the main flow chamber from the thermal management chamber; and wherein the flow guide is coupled to the dividing wall.

3. The decomposition chamber of claim 2, wherein:

the flow guide is configured to route the first portion of the exhaust gas along the dividing wall; and a portion of the flow guide is partially arcuate or an entirety of the flow guide is partially arcuate.

4. The decomposition chamber of claim 3, further comprising louvers positioned on the dividing wall and configured to facilitate flow of the first portion of the exhaust gas from the thermal management chamber into the main flow chamber.

5. The decomposition chamber of claim 4, wherein the flow guide terminates proximate the louvers such that the first portion of the exhaust gas is routed to the louvers.

6. The decomposition chamber of claim 2, wherein:

the thermal management chamber comprises a thermal management chamber back wall; and the dividing wall is coupled to the thermal management chamber back wall.

7. The decomposition chamber of claim 1, wherein the body further comprises an exhaust assist aperture fluidly coupling the main flow chamber and the exhaust assist chamber.

8. The decomposition chamber of claim 1, wherein:

the main flow chamber is defined by:

a first sidewall comprising a first convex portion, and a second sidewall comprising a second convex portion; and the first and second convex portions are opposed to each other so as to form a constricted region in the main flow chamber.

9. The decomposition chamber of claim 8, further comprising:

a diffuser positioned within the main flow chamber, the diffuser comprising:

a diffuser inlet portion comprising diffuser perforations, the diffuser inlet portion being configured to receive the exhaust gas from the main flow chamber, and a diffuser flange portion configured to receive the exhaust gas from the diffuser inlet portion and provide the exhaust gas to the outlet;

wherein the constricted region is located upstream of the diffuser and positioned such that the first and third portions of the exhaust gas are directed to the constricted region prior to flowing around the diffuser inlet portion.

10. The decomposition chamber of claim 9, further comprising a mixer coupled to the first and second convex portions such that the first and third portions of the exhaust gas are routed through the mixer prior to flowing around the diffuser inlet portion.

11. The decomposition chamber of claim 10, further comprising louvers configured to facilitate flow of the first portion of the exhaust gas from the thermal management chamber into the main flow chamber.

12. The decomposition chamber of claim 11, wherein the louvers are positioned upstream of the first and second convex portions.

13. The decomposition chamber of claim 1, further comprising:

a diffuser positioned within the main flow chamber, the diffuser comprising:

a diffuser inlet portion comprising diffuser perforations, the diffuser inlet portion configured to receive the exhaust gas from the main flow chamber, and a diffuser flange portion configured to receive the exhaust gas from the diffuser inlet portion and provide the exhaust gas to the outlet.

14. The decomposition chamber of claim 1, further comprising:

a diffuser positioned within the main flow chamber, the diffuser comprising:

a diffuser inlet portion comprising diffuser perforations, the diffuser inlet portion configured to receive the exhaust gas from the main flow chamber, and a diffuser flange portion configured to receive the exhaust gas from the diffuser inlet portion and provide the exhaust gas to the outlet;

wherein the main flow chamber comprises a dividing wall that separates the main flow chamber from the thermal management chamber; and wherein the diffuser inlet portion is coupled to the dividing wall.

15. The decomposition chamber of claim 14, wherein the thermal management chamber is configured to route the third portion of the exhaust gas along the dividing wall.

16. The decomposition chamber of claim 1, further comprising:

a diffuser positioned within the main flow chamber, the diffuser comprising:

a diffuser inlet portion comprising diffuser perforations, the diffuser inlet portion configured to receive the exhaust gas from the main flow chamber, and a diffuser flange portion configured to receive the exhaust gas from the diffuser inlet portion and provide the exhaust gas to the outlet; and an annular plate coupled to the body downstream of the diffuser and upstream of the outlet, the annular plate comprising an annular plate aperture configured to receive the exhaust gas from the diffuser and to provide the exhaust gas to the outlet.

17. The decomposition chamber of claim 16, wherein:

the annular plate is coupled to the body such that the diffuser flange portion is spaced from the annular plate; and a diameter of the diffuser flange portion is less than a diameter of the diffuser inlet portion.

18. A decomposition chamber for an aftertreatment system, the decomposition chamber comprising:

a body comprising:

an inlet configured to receive exhaust gas, an outlet configured to expel the exhaust gas, a thermal management chamber in fluid communication with the inlet, the thermal management chamber configured to receive a first portion of the exhaust gas from the inlet, and a main flow chamber in fluid communication with the inlet, the main flow chamber configured to receive a second portion of the exhaust gas from the inlet and to receive the first portion of the exhaust gas from the thermal management chamber, the main flow chamber comprising a dividing wall that separates the main flow chamber from the thermal management chamber; and a flow guide coupled to the dividing wall and projecting into the thermal management chamber.

19. The decomposition chamber of claim 18, wherein:

the flow guide is configured to route the first portion of the exhaust gas along the dividing wall; and a portion of the flow guide is partially arcuate or an entirety of the flow guide is partially arcuate.

20. The decomposition chamber of claim 19, further comprising:

louvers positioned on the dividing wall and configured to facilitate flow of the first portion of the exhaust gas from the thermal management chamber into the main flow chamber;

wherein the flow guide terminates proximate the louvers such that the first portion of the exhaust gas is routed to the louvers.

* * * * *